United States Patent
Tatara et al.

(10) Patent No.: US 11,872,604 B2
(45) Date of Patent: Jan. 16, 2024

(54) IMAGE PICKUP DEVICE FOR VEHICLE, VEHICLE LAMP AND ELECTRONIC CONTROL UNIT

(71) Applicant: KOITO MANUFACTURING CO., LTD., Tokyo (JP)

(72) Inventors: Naoki Tatara, Shizuoka (JP); Toshihiro Okamura, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 73 days.

(21) Appl. No.: 17/240,623

(22) Filed: Apr. 26, 2021

(65) Prior Publication Data

US 2021/0252562 A1 Aug. 19, 2021

Related U.S. Application Data

(62) Division of application No. 15/560,557, filed as application No. PCT/JP2016/058356 on Mar. 16, 2016, now abandoned.

(30) Foreign Application Priority Data

Mar. 23, 2015 (JP) ................................. 2015-060176
Mar. 23, 2015 (JP) ................................. 2015-060177
Mar. 23, 2015 (JP) ................................. 2015-060178

(51) Int. Cl.
*B08B 5/02* (2006.01)
*F21V 19/00* (2006.01)
(Continued)

(52) U.S. Cl.
CPC .............. *B08B 5/02* (2013.01); *B60Q 1/0023* (2013.01); *B60Q 1/2661* (2013.01); *B60Q 1/381* (2022.05);
(Continued)

(58) Field of Classification Search
CPC ...... B08B 5/02; B60Q 1/0023; B60Q 1/2661; B60Q 1/38; B60Q 1/525; B60Q 9/008;
(Continued)

(56) References Cited

U.S. PATENT DOCUMENTS 7,826,806 B2 * 11/2010 Choi ..................... H01H 25/041
200/305
8,581,982 B1 11/2013 Haley et al.
(Continued)

FOREIGN PATENT DOCUMENTS

| CN | 203713824 U | 7/2014 |
| DE | 298 06 638 U1 | 7/1998 |

(Continued)

OTHER PUBLICATIONS

International Search Report dated Jun. 14, 2016, issued by the International Searching Authority in counterpart International Application No. PCT/JP2016/058356 (PCT/ISA/210).
(Continued)

*Primary Examiner* — Nasim N Nirjhar
(74) *Attorney, Agent, or Firm* — Sughrue Mion, PLLC

(57) ABSTRACT

The present invention is provided with: an outer housing configured from a housing having an opening, and a translucent cover closing the opening; a substrate disposed inside of the outer hosing; a camera module, which has an image pickup element, and is disposed on the substrate; and a light emitting element, which is provided as a light source, and is disposed on the substrate. Consequently, since the camera module and the light emitting element are disposed on the substrate that is disposed inside of the outer housing, the number of configuration components is small, thereby achieving reduction of the number of components, and size reduction.

8 Claims, 29 Drawing Sheets

(51) Int. Cl.

| | | |
|---|---|---|
| *F21V 23/00* | (2015.01) | |
| *B60Q 1/00* | (2006.01) | |
| *B60S 1/08* | (2006.01) | |
| *B60S 1/56* | (2006.01) | |
| *B60S 1/54* | (2006.01) | |
| *B60R 1/00* | (2022.01) | |
| *B60Q 1/26* | (2006.01) | |
| *H04N 23/50* | (2023.01) | |
| *H04N 23/55* | (2023.01) | |
| *H04N 23/56* | (2023.01) | |
| *H04N 23/57* | (2023.01) | |
| *H04N 23/63* | (2023.01) | |
| *B60Q 1/38* | (2006.01) | |
| *F21S 43/19* | (2018.01) | |
| *B60Q 9/00* | (2006.01) | |
| *B60R 11/00* | (2006.01) | |

(52) U.S. Cl.
CPC ............... *B60Q 9/008* (2013.01); *B60R 1/00* (2013.01); *B60S 1/0848* (2013.01); *B60S 1/54* (2013.01); *B60S 1/56* (2013.01); *F21S 43/19* (2018.01); *F21V 19/00* (2013.01); *F21V 23/00* (2013.01); *H04N 23/50* (2023.01); *H04N 23/55* (2023.01); *H04N 23/56* (2023.01); *H04N 23/57* (2023.01); *H04N 23/633* (2023.01); *B60R 2011/004* (2013.01); *B60R 2300/103* (2013.01); *B60R 2300/307* (2013.01); *B60R 2300/804* (2013.01); *B60R 2300/8046* (2013.01); *B60R 2300/8066* (2013.01)

(58) Field of Classification Search
CPC ............... B60R 1/00; B60R 2011/004; B60R 2300/103; B60R 2300/307; B60R 2300/804; B60R 2300/8046; B60R 2300/8066; B60S 1/0848; B60S 1/54; B60S 1/56; F21S 43/19; F21S 43/14; F21S 43/02; F21V 19/00; F21V 23/00; H04N 5/2251; H04N 5/2254; H04N 5/2256; H04N 5/2257; H04N 5/232939
See application file for complete search history.

(56) References Cited

U.S. PATENT DOCUMENTS

| | | | |
|---|---|---|---|
| 8,953,841 B1 | 2/2015 | Leblang | |
| 11,273,766 B2* | 3/2022 | Herrmann | B60Q 1/0023 |
| 2002/0071676 A1 | 6/2002 | Chu | |
| 2003/0155001 A1 | 8/2003 | Hoetzer et al. | |
| 2005/0117027 A1 | 6/2005 | Fukuhara et al. | |
| 2007/0278406 A1 | 12/2007 | Haug | |
| 2009/0041452 A1 | 2/2009 | Yoneji | |
| 2009/0059005 A1 | 3/2009 | Hattori et al. | |
| 2010/0321497 A1* | 12/2010 | Onishi | B60R 1/10 348/148 |
| 2011/0193960 A1 | 8/2011 | Endo et al. | |
| 2011/0292212 A1 | 12/2011 | Tanabe et al. | |
| 2012/0206043 A1* | 8/2012 | Yamazaki | B60Q 1/143 315/82 |
| 2013/0048035 A1 | 2/2013 | Doi et al. | |
| 2014/0009615 A1 | 1/2014 | Kiyohara et al. | |
| 2014/0085466 A1 | 3/2014 | Moriyama | |
| 2015/0109449 A1 | 4/2015 | Endo et al. | |
| 2015/0151722 A1 | 6/2015 | Gokan et al. | |
| 2015/0166021 A1 | 6/2015 | Gokan et al. | |
| 2016/0191863 A1* | 6/2016 | Minikey, Jr. | H04N 5/2252 348/148 |
| 2016/0257252 A1 | 9/2016 | Zaitsez | |

FOREIGN PATENT DOCUMENTS

| | | |
|---|---|---|
| DE | 103 02 748 A1 | 8/2004 |
| DE | 103 32 939 A1 | 2/2005 |
| DE | 20 2004 019 067 U1 | 3/2005 |
| DE | 10 2012 008 930 A1 | 12/2012 |
| EP | 3 178 709 A1 | 6/2017 |
| JP | 2005145428 A | 6/2005 |
| JP | 20015145428 A | 6/2005 |
| JP | 2006173835 A | 6/2006 |
| JP | 2006-323334 A | 11/2006 |
| JP | 2007-53448 A | 3/2007 |
| JP | 200783841 A | 4/2007 |
| JP | 200884719 A | 4/2008 |
| JP | 2009-55427 A | 3/2009 |
| JP | 2009-67341 A | 4/2009 |
| JP | 2011162080 A | 8/2011 |
| JP | 2011184030 A | 9/2011 |
| JP | 2012132988 A | 7/2012 |
| JP | 2012-201122 A | 10/2012 |
| JP | 2013-216290 A | 10/2013 |
| JP | 2014-116756 A | 6/2014 |
| JP | 2014-121895 A | 7/2014 |
| WO | 2014/010579 A1 | 1/2014 |
| WO | 2015/037908 A1 | 3/2015 |

OTHER PUBLICATIONS

Written Opinion dated Jun. 14, 2016, issued by the International Searching Authority in counterpart International Application No. PCT/JP2016/058356 (PCT/ISA/237).

Communication dated Dec. 13, 2018, issued by the European Patent Office in counterpart European Application No. 16768585.8.

Office Action dated Jan. 19, 2021, issued by the Japanese Patent Office in counterpart Japanese Patent Application No. 2020-051686.

Communication dated Dec. 19, 2018, issued by the European Patent Office in counterpart European Application No. 18187064.3.

Communication dated Dec. 13, 2018, issued by the European Patent Office in counterpart European Application No. 18187065.0.

\* cited by examiner

IMAGE PICKUP DEVICE FOR VEHICLE, VEHICLE LAMP AND ELECTRONIC CONTROL UNIT

CROSS-REFERENCE TO RELATED APPLICATION

This is a divisional of application Ser. No. 15/560,557 filed Sep. 22, 2017, which is a National Stage of International Application No. PCT/JP2016/058356 filed Mar. 16, 2016, claiming priority of Japanese Patent Applications No. 2015-060176, filed on Mar. 23, 2015, No. 2015-060177, filed on Mar. 23, 2015 and No. 2015-060178, filed on Mar. 23, 2015, the disclosures of which are incorporated herein by reference.

TECHNICAL FIELD

The present invention relates to an image pickup device for vehicle, a vehicle lamp, and an electronic control unit.

RELATED ART

A vehicle lamp, in which a light source configured to emit light into an outer housing comprising a translucent cover and a housing and a camera module configured to capture a predetermined region are disposed, has been known (for example, refer to JP-A-2011-184030).

The vehicle lamp is used with being mounted to both right and left side surfaces of a vehicle body, as side turn signal lamps, for example. A region ranging from the rear to the side is captured by the camera module, and a picked-up image is displayed on a screen of a display disposed in a vehicle interior.

A driver can perceive a situation of the region ranging from the rear to the side and drive a vehicle in correspondence to the perceived situation by visually recognizing the left image and the right images displayed on the screen of the display.

The vehicle lamp is provided, so that the region ranging from the rear to the side is captured by the camera module. Therefore, it is possible to manufacture a vehicle with no side-view mirror. Also, since a predetermined region is captured by the vehicle lamp, the vehicle lamp is used as an image pickup device for vehicle, too.

SUMMARY OF THE INVENTION

Problems to be Solved

In the vehicle lamp having a light source and a camera module, the camera module is embedded, so that an outer shape of the lamp fitting is likely to be enlarged as much as that. Also, since at least a part is disposed with protruding outward from the vehicle body, the lamp fitting is required to be made as small as possible so as to reduce a protrusion amount from the vehicle body.

However, like the vehicle lamp disclosed in Patent Document 1, according to the configuration where a chassis is disposed in the outer housing, a substrate is mounted to the chassis, and the camera module is kept at a holder, many constitutional components are disposed in the outer housing, so that the number of components increases and the size also increases as the number of components increases.

The present invention has been made to solve the above problems, and an object thereof is to reduce the number of components and the size.

Means for Solving Problems

As a first invention, a vehicle lamp of the present invention includes an outer housing comprising a housing having an opening and a translucent cover configured to close the opening, a substrate disposed in the outer housing, a camera module comprising an image pickup element and disposed on the substrate, and a light emitting element provided as a light source and disposed on the substrate.

Thereby, the camera module and the light emitting element are disposed on the substrate disposed in the outer housing.

As a second invention, in the vehicle lamp of the present invention, the camera module and the light emitting element are preferably disposed on the same surface of the substrate.

Thereby, a wiring pattern for the light emitting element and a wiring pattern for the camera module can be made to be adjacent to each other or can be used in common.

As a third invention, in the vehicle lamp of the present invention, preferably, a pressing member disposed in the outer housing and mounted to the housing is provided, and the substrate is pressed by the pressing member and is thus positioned relative to the housing.

In this way, the pressing member is mounted to the housing, so that the substrate is positioned relative to the housing.

As a fourth invention, in the vehicle lamp of the present invention, preferably, a part of the pressing member is provided as a light shield part for shielding a part of light to be emitted from the light emitting element.

Thereby, the pressing member for pressing the substrate and positioning the substrate relative to the housing functions as a light shield part for shielding a part of light to be emitted from the light emitting element, too.

As a fifth invention, in the vehicle lamp of the present invention, preferably, an effective incident region of a capturing light of the image pickup element is formed into a shape having a longitudinal direction and a width direction, and the image pickup element is disposed in a direction in which the longitudinal direction of the effective incident region is an upper and lower direction.

Thereby, it is possible to capture a vertically long image by the camera module, so that a sufficient angle of view is secured in the upper and lower direction.

As a sixth invention, in the vehicle lamp of the present invention, preferably, an optical axis of the camera module is inclined more downward than a horizontal direction.

Thereby, a downward capturing range of the camera module increases.

As a seventh invention, in the vehicle lamp of the present invention, preferably, the translucent cover is provided with a transmission window through which a capturing light to be incident on the camera module is to pass, and the translucent cover is provided with a light shield part for preventing a light, which is to be emitted from the light emitting element and to be guided along an inside of the translucent cover, from entering into the transmission window.

Thereby, the light, which is guided along the inside of the translucent cover upon emission of the light from the light emitting element, is prevented from entering into the transmission window by the light shield part.

In an eighth invention, an image pickup device for vehicle of the present invention includes a camera module of which a capturing range is set as a region ranging from the rear to the side, including a part of a side surface of a vehicle body, wherein when an image is captured and displayed on a screen by the camera module, at least the part of the side surface is covered or made unclear on the screen by an image distinction means, so that the side surface and a part except for the side surface are visually distinguished.

Thereby, upon the capturing of the camera module, the screen is visually recognized at a state where at least the part of the side surface of the vehicle body is covered or made unclear.

As a ninth invention, in the image pickup device for vehicle of the present invention, preferably, a shade for shielding a part of the capturing light to be incident on the camera module is provided as the image distinction means.

Thereby, a part of the capturing light is shielded by the shade, so that the side surface and a part except for the side surface are visually distinguished.

As a tenth invention, in the image pickup device for vehicle of the present invention, preferably, the housing and the shade are integrally formed.

Thereby, the side surface and a part except for the side surface are visually distinguished without increasing the number of components.

As an eleventh invention, in the image pickup device for vehicle of the present invention, preferably, the translucent cover is formed with a step as the image distinction means.

Thereby, a part of the capturing light to be incident on the camera module is controlled by the step, so that the side surface and a part except for the side surface are visually distinguished.

As a twelfth invention, in the image pickup device for vehicle of the present invention, preferably, the translucent cover is formed with a colored part having a predetermined color, as the image distinction means.

Thereby, an image in which the side surface is colored is displayed on the screen, so that the side surface and a part except for the side surface are visually distinguished.

As a thirteenth invention, in the image pickup device for vehicle of the present invention, preferably, an image processing unit configured to process an image captured by the camera module is provided as the image distinction means.

Thereby, the side surface and a part except for the side surface are visually distinguished by predetermined image processing of the image processing unit.

In a fourteenth invention, a vehicle lamp of the present invention includes the image pickup device for vehicle and a light source.

Thereby, upon the capturing of the camera module, the screen is visually recognized at a state where at least the part of the side surface of the vehicle body is covered or made unclear.

In a fifteenth invention, an electronic control unit of the present invention is configured so that when an image is captured and displayed on a screen by a camera module of which a capturing range is set as a region ranging from the rear to the side, including a part of a side surface of a vehicle body, at least the part of the side surface is covered or made unclear on the screen by an image distinction means and the side surface and a part except for the side surface are thus visually distinguished.

Thereby, upon the capturing of the camera module, the screen is visually recognized at a state where at least the part of the side surface of the vehicle body is covered or made unclear.

In a sixteenth invention, an image pickup device for vehicle of the present invention includes an outer housing comprising a housing having an opening and a translucent cover configured to close the opening, a camera module having an image pickup element and disposed in the outer housing, and a nozzle having a discharge hole configured to discharge a fluid, wherein the translucent cover is provided with a transmission window through which a capturing light to be incident on the camera module is to pass, and the discharge hole is made to face toward the transmission window.

Thereby, the fluid that is discharged from the nozzle is ejected to the transmission window, so that foreign matters attached on the transmission window are removed.

As a seventeenth invention, in the image pickup device for vehicle of the present invention, preferably, a light emitting element functioning as a light source configured to emit a light is disposed in the outer housing.

Thereby, the light emitted from the light emitting element is illuminated outside.

As an eighteenth invention, in the image pickup device for vehicle of the present invention, preferably, the housing and the nozzle are integrally formed.

Thereby, the fluid is discharged from the nozzle integrally provided at the housing.

As a nineteenth invention, in the image pickup device for vehicle of the present invention, preferably, a high-pressure air is used as the fluid.

Thereby, various kinds of foreign matters including liquid attached to the transmission window can be removed.

As a twentieth invention, in the image pickup device for vehicle of the present invention, preferably, an outer surface of at least the transmission window of the translucent cover is water repellent finished.

Thereby, drops of water are difficult to be attached to the transmission window.

As a twenty first invention, in the image pickup device for vehicle of the present invention, preferably, the fluid is discharged from the nozzle upon startup of an engine of a vehicle.

Thereby, each before the vehicle starts to travel, the foreign matters attached to the transmission window are removed.

As a twenty second invention, in the image pickup device for vehicle of the present invention, preferably, the fluid is discharged from the nozzle upon shift to a back gear of a vehicle.

Thereby, each before the vehicle starts to travel rearward, the foreign matters attached to the transmission window are removed.

Effects of the Invention

According to the present invention, since the camera module and the light emitting element are disposed on the substrate disposed in the outer housing, the number of the constitutional components is small, so that it is possible to reduce the number of components and the size.

DETAILED DESCRIPTION OF ILLUSTRATIVE EMBODIMENTS

Figure 1:
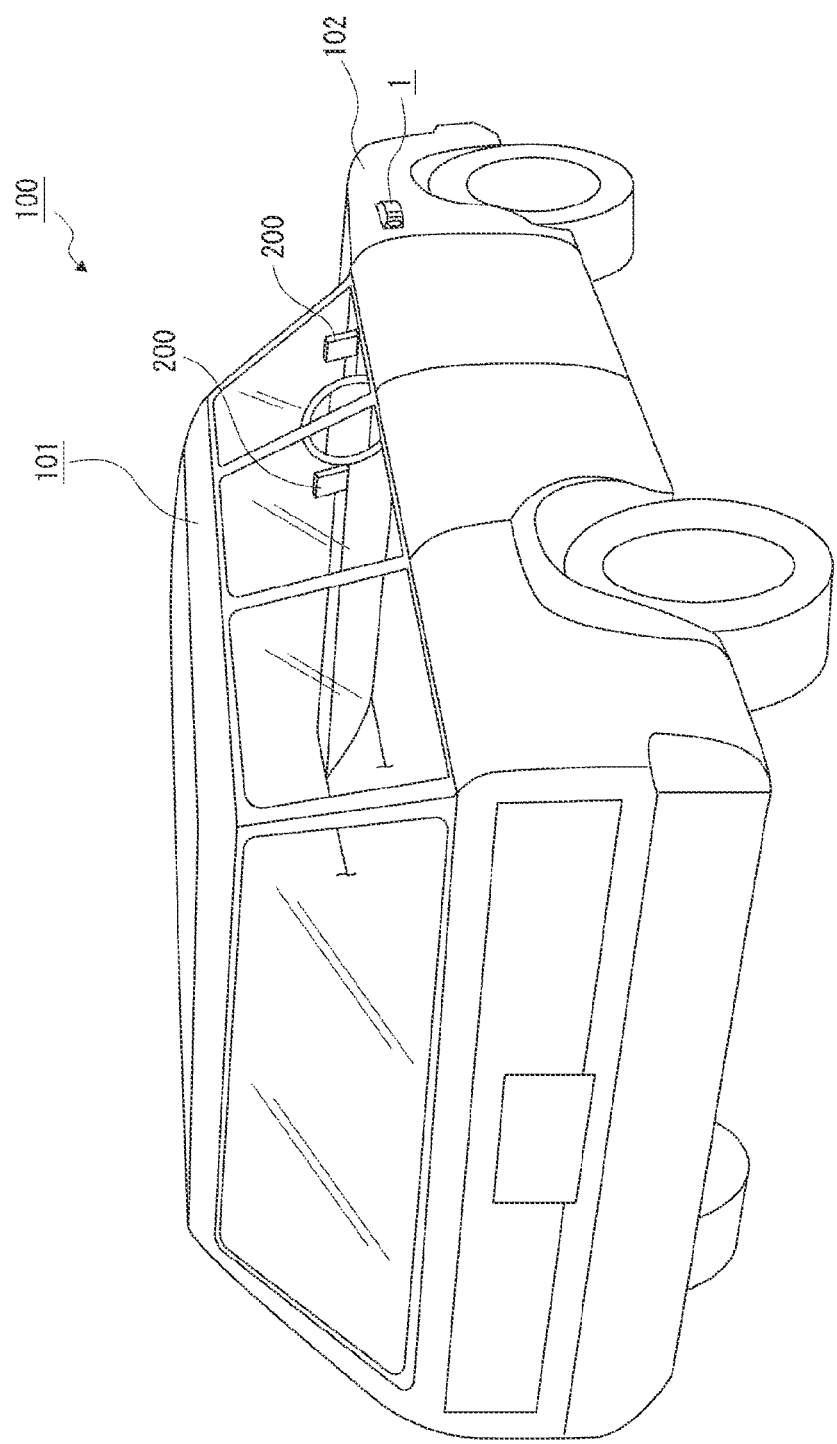
FIG. 1 is a perspective view of a vehicle, depicting an illustrative embodiment of the present invention together with FIGS. 2 to 36.

Hereinafter, an illustrative embodiment of the present invention will be described with reference to the accompanying drawings. Meanwhile, reference numerals indicating directions are denoted in the respective drawings, as necessary. At a state where a vehicle lamp is mounted to a vehicle body, U indicates the upward direction, D indicates the downward direction, F indicates the forward direction, B indicates the backward direction, L indicates the leftward direction and R indicates the rightward direction.

In the illustrative embodiment, the present invention is applied to a side turn signal lamp. In the meantime, the present invention is not limited to the side turn signal lamp, and can be widely applied to various vehicle lamp such as a headlamp, a clearance lamp, a tail lamp, a turn signal lamp, a stop lamp, a daytime running lamp, a cornering lamp, a hazard lamp, a position lamp, a back lamp, a fog lamp, a high-mount stop lamp, a foot lamp, a combination lamp thereof and the like inasmuch as a camera module is disposed therein, an image pickup device for vehicle relating to the lamp, and an electronic control unit therefor.

Lamp fittings 1,1 for vehicle function as an image pickup device for vehicle, too, and are mounted to both right and left side surfaces 102, 102 of a vehicle body 101 of a vehicle 100 (refer to FIG. 1). In the meantime, a structure functioning only as an image pickup device for vehicle may be mounted to the vehicle body 101. In this case, a camera module (which will be described later) for capturing is disposed in the image pickup device for vehicle, but a light source for emitting a light is not disposed.

As described above, the vehicle lamp 1 functions as an image pickup device for vehicle, too, and can capture a region ranging from the rear to the side of the vehicle 100 by a camera module, for example. An image (video picture) captured by the camera module is displayed on each screen of displays 200, 200 disposed in a vehicle interior. A left image and a right image are respectively displayed on the screens of the displays 200, 200. In the meantime, one display 200 may be provided in the vehicle interior, and the display 200 may be provided with two screens on which the left image and the right image are to be respectively displayed.

A driver can perceive a situation of the region ranging from the rear to the side and drive the vehicle in correspondence to the perceived situation by visually recognizing the left image and the right images displayed on the respective screens of the displays 200, 200.

In this way, since the lamp fittings 1, 1 for vehicle can capture the region ranging from the rear to the side of the vehicle 100, the vehicle 100 is not provided with a side-view mirror, so that a size can be reduced.

The vehicle lamp 1 includes a housing 2 and a translucent cover 3 (refer to FIGS. 2 to 5). An outer housing 4 is configured by the housing 2 and the translucent cover 3, and an internal space of the outer housing 4 is formed as a lamp chamber 5.

The housing 2 is formed of a resin material, for example, and has a case part 6 opening laterally, a cover mounting part 7 continuing to an opening edge of the case part 6, and a protrusion part 8 protruding laterally from the case part 6, which are integrally formed.

The case part 6 has an upper surface part 9 facing in an upper and lower direction, a lower surface part 10 facing in the upper and lower direction, a front surface part 11 facing in a substantial front and back direction, a rear surface part 12 facing in the front and back direction, and a bottom surface part 13 facing in a right and left direction, and side edges of respective one sides of the upper surface part 9, the lower surface part 10, the front surface part 11 and the rear surface part 12 continue to a peripheral edge of the bottom surface part 13.

Figure 5:
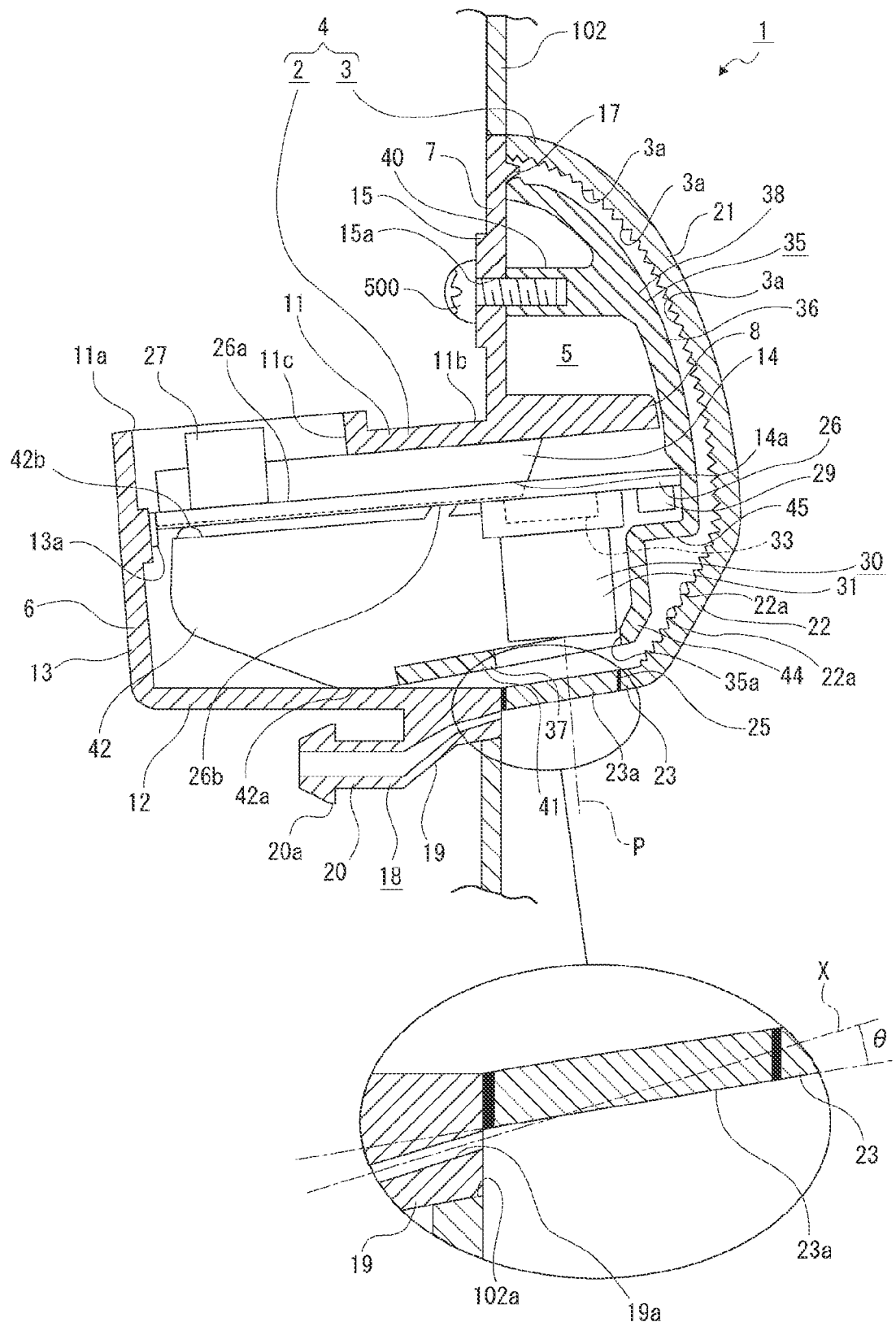
FIG. 5 is a sectional view taken along a line V-V of FIG. 3.
Figure 6:
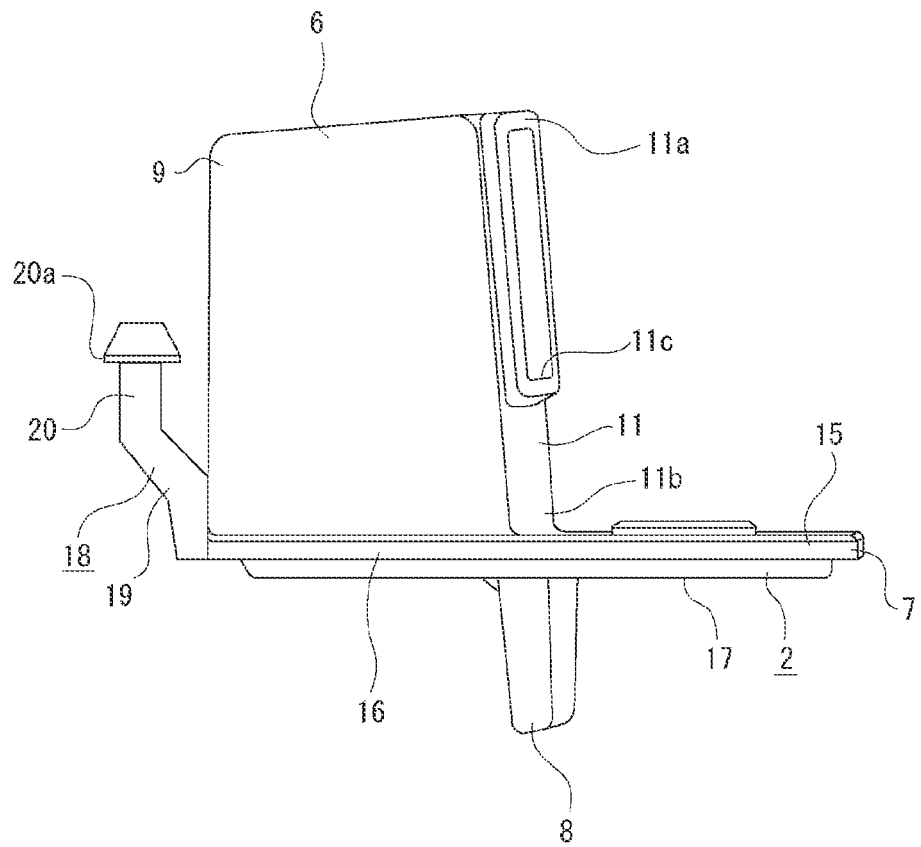
FIG. 6 is an enlarged plan view of a housing.

The front surface part 11 is slightly inclined obliquely downward with respect to a vertical direction (refer to FIG. 6), and is also inclined so that an end portion 11a provided at a side (inner side) of the bottom surface part 13 in the right and left direction is located slightly further rearward than an end portion 11b provided at an opposite side (outer side) to the bottom surface part 13 (refer to FIG. 5). A side of the front surface part 11 facing toward the end portion 11a is formed with an arrangement opening 11c penetrating in the front and back direction. An inner surface of the front surface part 11 is provided with positioning protrusions 14, 14 protruding rearward from both upper and lower end portions (refer to FIGS. 2 and 5).

The positioning protrusions 14, 14 have receiving surfaces 14a, 14a facing rearward and pressing surfaces 14b, 14b facing upward or downward, respectively.

Figure 2:
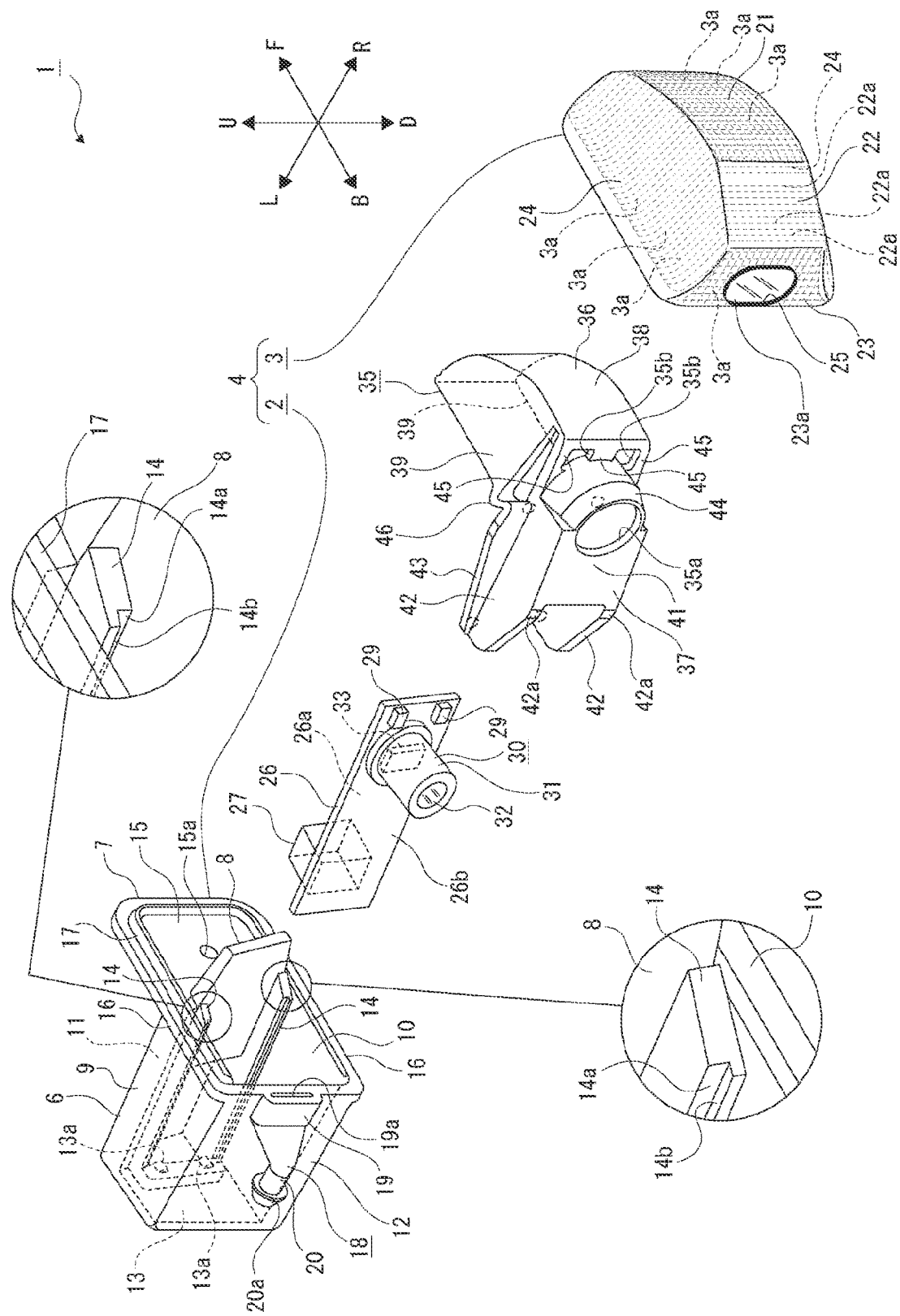
FIG. 2 is an exploded perspective view of a vehicle lamp.
Figure 7:
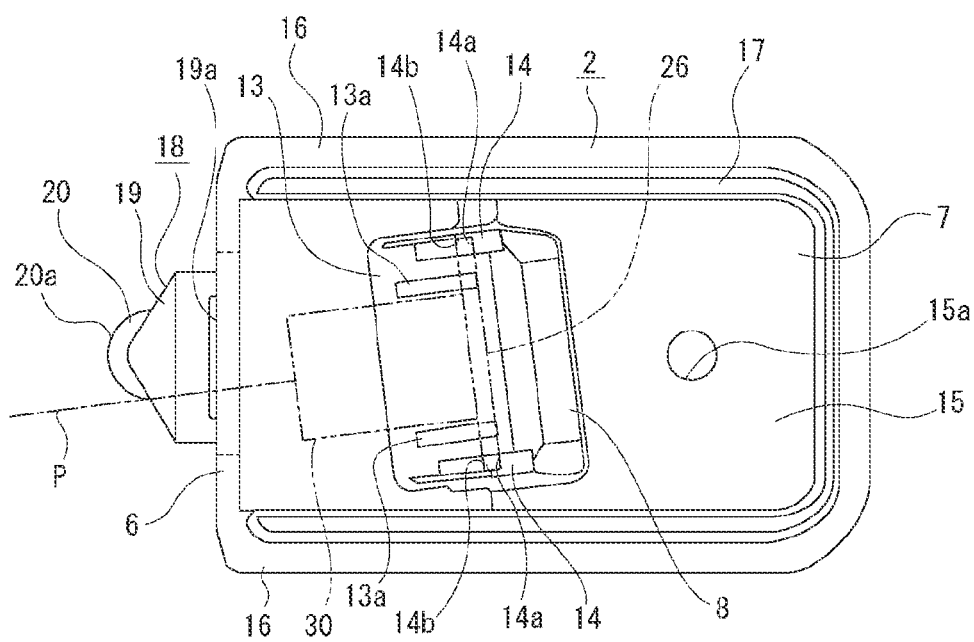
FIG. 7 is an enlarged rear view of the housing.
Figure 8:
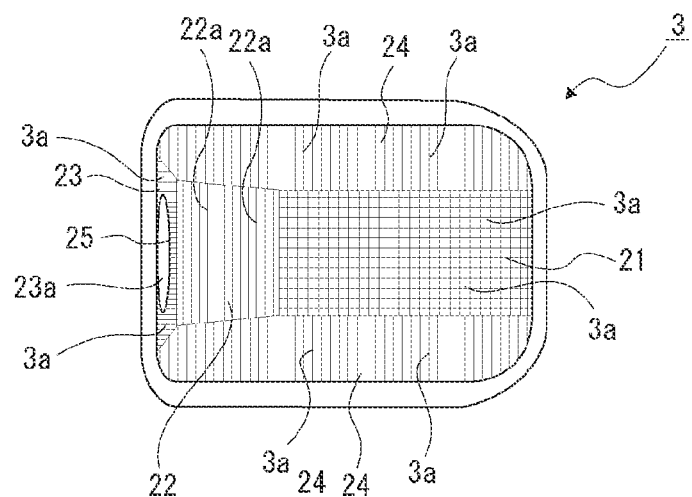
FIG. 8 is a front view of a translucent cover.
Figure 9:
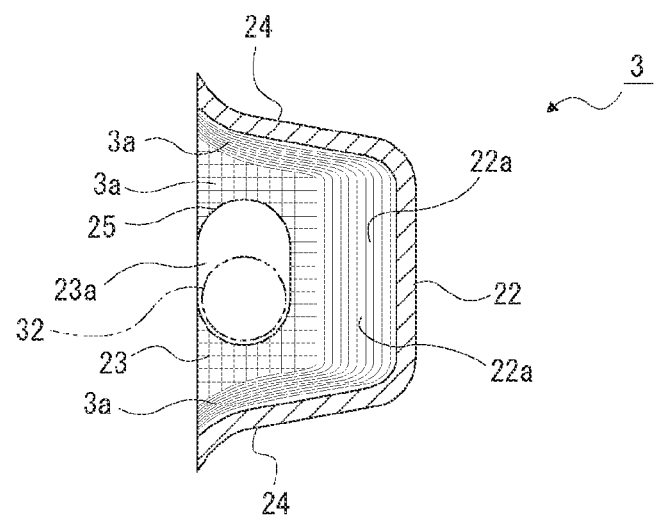
FIG. 9 is a vertical sectional view of the translucent cover.
Figure 10:
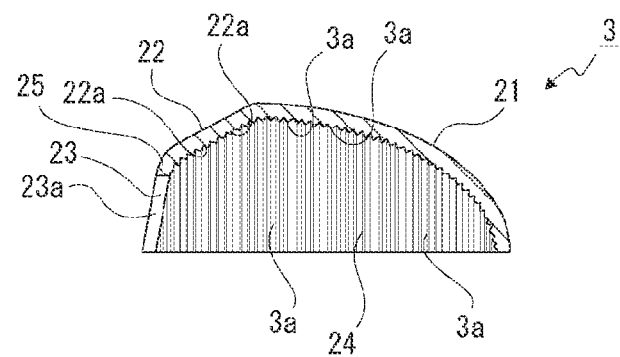
FIG. 10 is a horizontal sectional view of the translucent cover.

An inner surface of the bottom surface part 13 is provided with restraint protrusions 13a, 13a spaced in the upper and lower direction (refer to FIGS. 2, 5 and 7).

The cover mounting part 7 has a base part 15 having a substantial flat plate shape and extending in the right and left direction, and projections 16, 16 projecting upward or downward from the respective side edges of the upper surface part 9 and the lower surface part 10. The base part 15 is formed at its substantially central portion with a screw insertion hole 15a. The projections 16, 16 continue at front ends thereof to a rear end of an outer peripheral portion of the base part 15. A positioning rib 17 protruding laterally is provided at a position extending from the projections 16, 16 to the outer peripheral portion of the base part 15. The positioning rib 17 has a concave shape opening rearwards, as a whole.

The protrusion part 8 protrudes laterally from the front surface part 11. The protrusion part 8 is inclined in the same directions as the front surface part 11 with respect to the upper and lower direction and the right and left direction, is slightly inclined obliquely downward with respect to the vertical direction, and is also inclined so that an end portion provided at a side of the front surface part 11 in the right and left direction is located slightly further rearward than a tip end portion.

The housing 2 is formed integrally with a nozzle 18 at the rear surface part 12, for example. The nozzle 18 has a function of discharging a fluid (which will be described later) toward a predetermined part of the translucent cover 3, and has a discharge part 19 and a coupling cylinder part 20 continuing to the discharge part 19.

The discharge part 19 is configured so that one end face of a side thereof is flush with one end face of a side of the rear surface part 12. The discharge part 19 has a discharge hole 19a. An opening of the discharge hole 19a has a vertically long shape.

The coupling cylinder part 20 is located at the rear of the rear surface part 12 with being spaced from the rear surface part 12. The coupling cylinder part 20 is provided with an annular engaging protrusion 20a projecting outward. The coupling cylinder part 20 is coupled with one end portion of a piping made of rubber, resin or the like, and the piping is closely contacted and engaged to the engaging protrusion 20a, so that the piping is prevented from separating from the nozzle 18.

As described above, the housing 2 and the nozzle 18 are integrally formed, so that the fluid is discharged from the nozzle 18 integrally formed with the housing 2. Therefore, it is possible to reduce the number of components, to simplify the structure of the vehicle lamp 1 and to save the manufacturing cost of the vehicle lamp 1.

The translucent cover 3 is formed of a transparent material such as resin, glass or the like, and has a bowl shape opening laterally as a whole, and a length in the front and back direction is longer than lengths in the upper and lower direction and the right and left direction (refer to FIGS. 2, 5, 8, 9 and 10). The translucent cover 3 has a curved surface part 21 located at a central portion in the upper and lower direction, an emission surface part 22 continuing to a rear end of the curved surface part 21, a flat plate surface part 23 continuing to a rear end of the emission surface part 22, and side surface parts 24, 24 continuing to both upper and lower edges of the curved surface part 21, the emission surface part 22 and the flat plate surface part 23.

The curved surface part 21 has a curved surface shape convex toward an outside of the vehicle, and a curvature of a half front part thereof is greater than a rear half part.

The emission surface part 22 is inclined in a direction of coming close to the side surface 102 of the vehicle body 101 toward the rear. The emission surface part 22 is formed on its inner surface with optical steps 22a, 22a, • • •. The optical steps 22a, 22a, • • • have a function of controlling a light emitted from a light emitting element (light source) (which will be described later). The light emitted from the light emitting element, passing through the emission surface part 22 and facing outward is controlled by the optical steps 22a, 22a, • • • and is then illuminated to a predetermined region.

The flat plate surface part 23 is slightly inclined in the front and back direction relative to the right and left direction, and an end edge continuing to the emission surface part 22 is located slightly further forward than an end edge most spaced from the emission surface part 22. The flat plate surface part 23 is provided with a transmission window 23a having no step, and the transmission window 23a has an oval shape that is long in the upper and lower direction, for example. In the meantime, the transmission window 23a preferably has a shape that is long in the upper and lower direction and is line-symmetric with respect to the upper and lower direction, and may also be formed to have another shape such as an elliptical shape. Also, the transmission window 23a is located in a region in which it does not disturb an angle of view of a camera module (which will be described later).

The flat plate surface part 23 is formed with a light shield part 25 at a position covering an outer periphery of the transmission window 23a. The light shield part 25 has a black band shape, for example, and is embedded in the flat plate surface part 23. For the light shield part 25, a material capable of absorbing and shielding the light or a material capable of reflecting and shielding the light may be used. The discharge hole 19a is inclined toward the transmission window 23a, and as shown in FIG. 5, an extending direction of the discharge hole 19a is inclined relative to a surface of the transmission window 23a by an angle θ, and a line segment X inclined by the angle θ intersects with the transmission window 23a. In this way, the extending direction of the discharge hole 19a is inclined relative to the surface of the transmission window 23a by the angle θ and the line segment X intersects with the transmission window 23a, so that a high-pressure air (which will be described later) to be discharged from the discharge hole 19a is ejected to the surface of the transmission window 23a and foreign matters attached to the transmission window 23a can be thus securely removed.

An inner surface of the translucent cover 3 is formed with steps 3a, 3a, • • • having a predetermined shape at portions except for the emission surface part 22 and the transmission window 23a. The steps 3a, 3a, • • • have a function of diffusing the light. The light incident on the translucent cover 3 from the outside is diffused by the steps 3a, 3a, • • •, so that a structure disposed in the outer housing 4 is difficult to be visually recognized. That is, the translucent cover 3 is formed with the steps 3a, 3a, • • •, so that a design property of the vehicle lamp 1 is improved.

As shown in FIG. 5, the translucent cover 3 is contacted to the cover mounting part 7 of the housing 2 with being externally fitted to the positioning rib 17, and is mounted to the cover mounting part 7 by adhesion, laser welding or the like with being positioned relative to the positioning rib 17.

Figure 3:
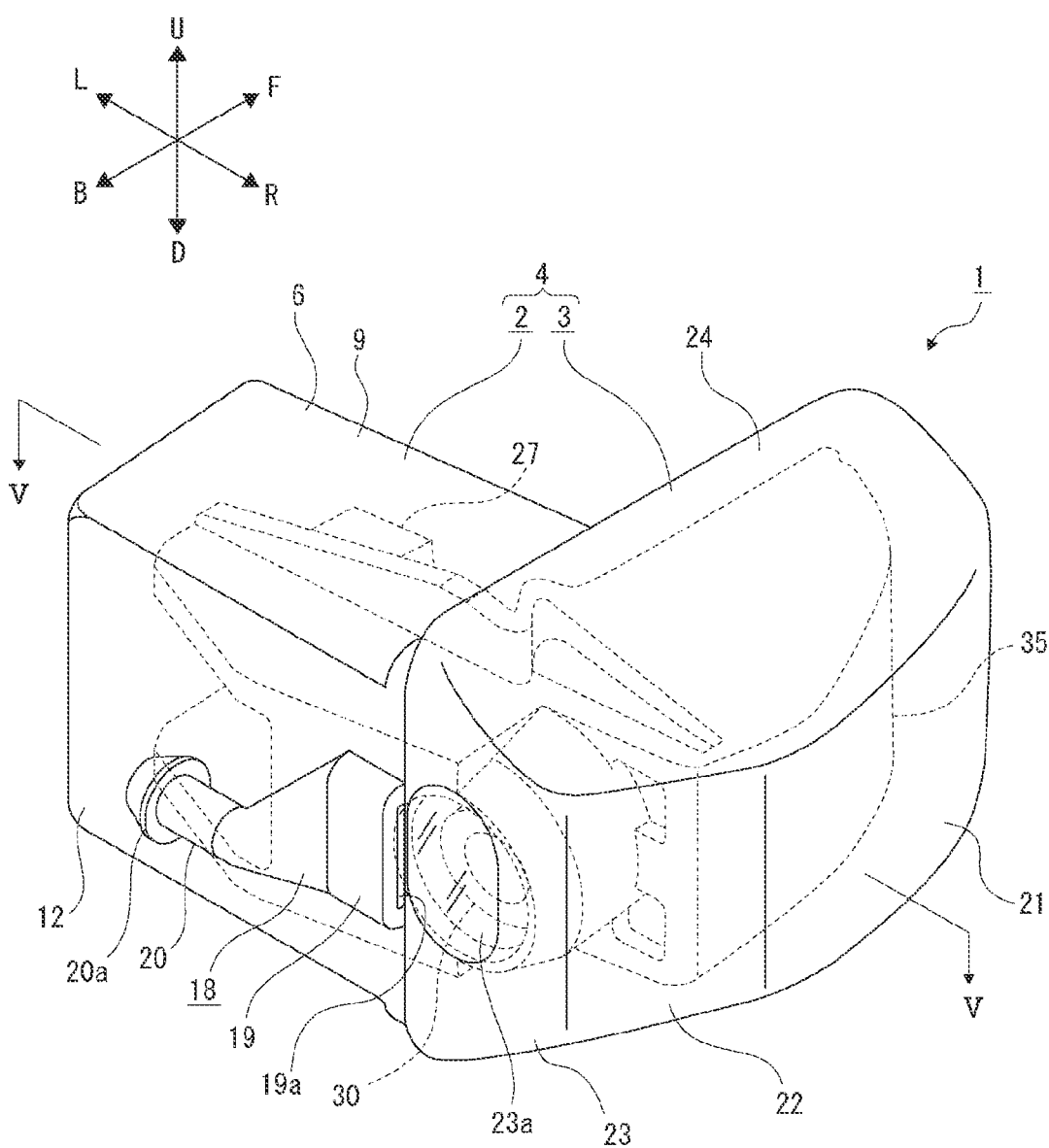
FIG. 3 is an enlarged perspective view of the vehicle lamp, depicting an internal structure with a broken line.
Figure 4:
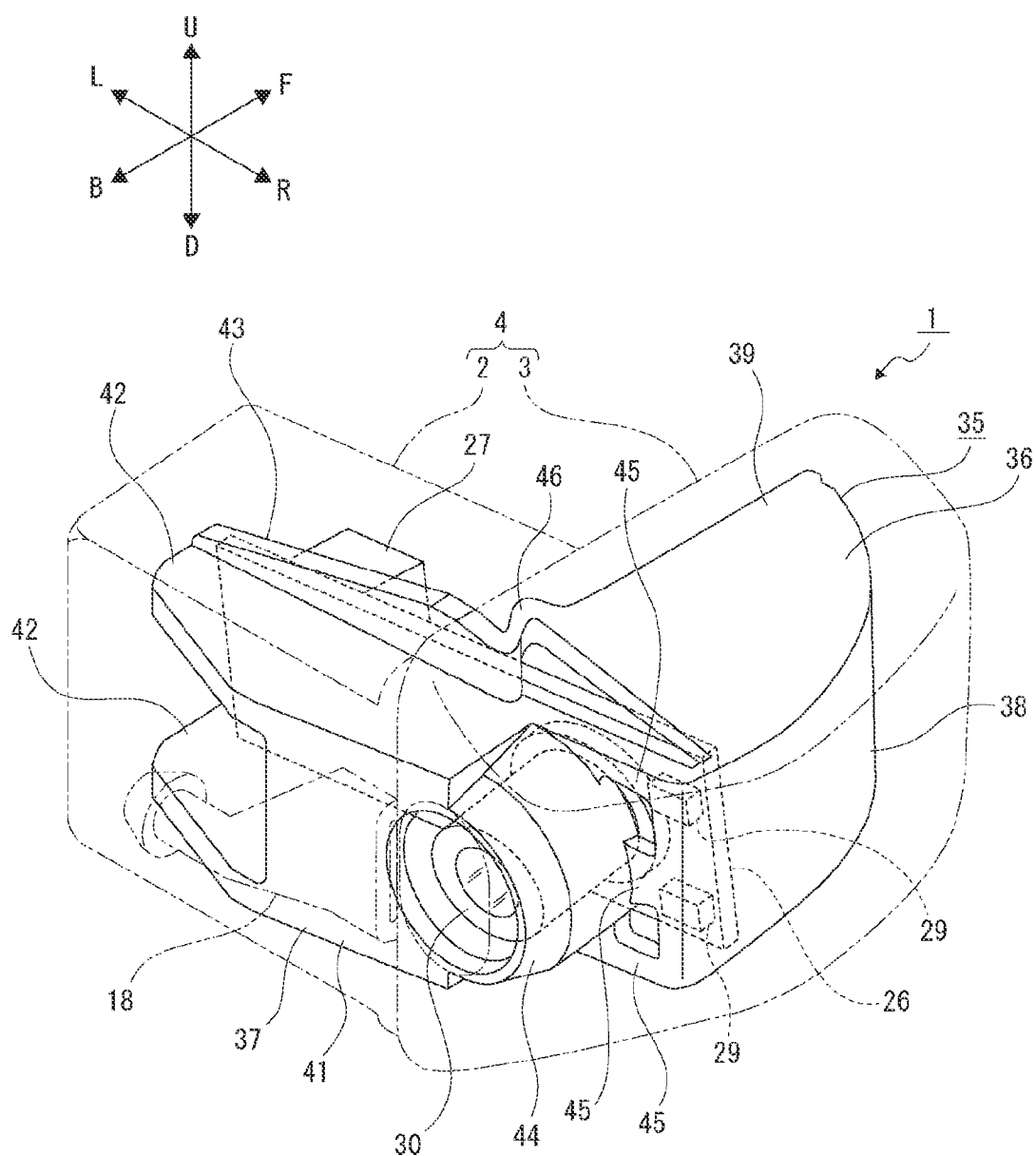
FIG. 4 is an enlarged perspective view of the vehicle lamp, depicting a part of the internal structure with a solid line.

At the state where the translucent cover 3 is mounted to the cover mounting part 7, the opening of the discharge hole 19a formed in the discharge part 19 of the nozzle 18 is located in the vicinity of the transmission window 23a of the translucent cover 3 (refer to FIGS. 3 and 5).

In the meantime, as described above, the curved surface part 21 has an outward convex curved surface shape, so that the translucent cover 3 is difficult to be applied with a resistance of wind, which occurs upon traveling of the vehicle 100.

In the outer housing 4, a substrate 26 is disposed (refer to FIGS. 3 and 5). The substrate 26 has a substantially rectangular shape facing toward the front and back direction and long in the right and left direction, and the substrate 26 is formed with a wiring pattern (not shown). A connector 27 is disposed at one end portion of a front surface 26a of the substrate 26 in the longitudinal direction (refer to FIGS. 2 and 11). The connector 27 protrudes forward from the substrate 26, and has functions of inputting power, outputting a signal of an image captured by a camera module (which will be described later), and the like. The connector 27 is connected with a connection terminal (not shown) of the vehicle 100.

Resistance elements 28, 28, 28 are disposed on the front surface 26a of the substrate 26. The resistance elements 28, 28, 28 have a function of performing current control for a light emitting element (which will be described later).

Figure 12:
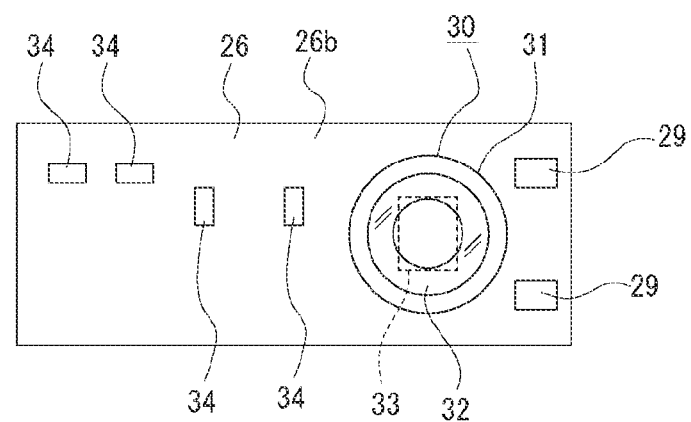
FIG. 12 is a rear view depicting the substrate and the respective parts disposed on the substrate.

Light emitting elements 29, 29 functioning as a light source are disposed with being spaced in the upper and lower direction on a rear surface 26b of the substrate 26 (refer to FIGS. 2 and 12). The light emitting elements 29, 29 are disposed at an opposite end portion to the end portion, at which the connector 27 is disposed, in a longitudinal direction of the substrate 26. As the light emitting elements 29, 29, light emitting diodes (LEDs) are used, for example.

A camera module 30 is mounted on the rear surface 26b of the substrate 26. The camera module 30 is located in the vicinity of the end portion, at which the light emitting elements 29, 29 are disposed, of the substrate 26 in the longitudinal direction, and protrudes rearward from the substrate 26. The camera module 30 has a substantially cylindrical lens tube 31, one or more lenses 32 held at the lens tube 31, and an image pickup element 33 disposed on the substrate 26. The camera module 30 is mounted to the substrate 26 by screwing the lens tube 31, for example.

The image pickup element 33 has a rectangular shape, and is mounted to the substrate 26 in a direction in which a longitudinal direction is the upper and lower direction. Therefore, the image pickup element 33 is disposed in a direction in which a longitudinal direction of an effective incident region of a capturing light, which is to be incident upon the capturing, is the upper and lower direction. On the other hand, the image pickup element 33 may be inclined upward or downward with respect to the vertical direction within a predetermined range, for example, within an angle range of 30°.

Figure 11:
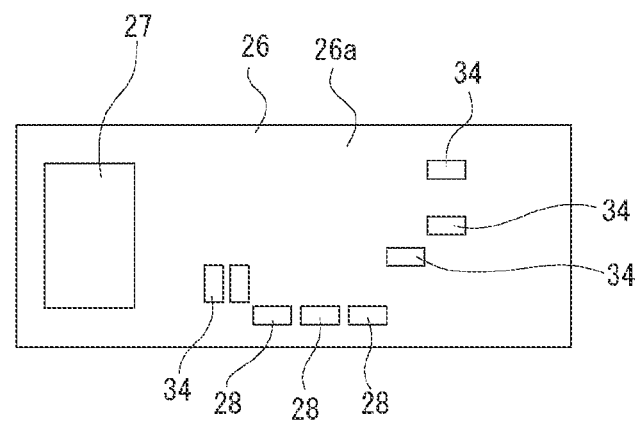
FIG. 11 is a front view depicting a substrate and respective parts disposed on the substrate.

Control elements (electronic components) 34, 34, • • • such as a diode, a capacitor and the like are disposed on the front surface 26a and the rear surface 26b of the substrate 26 (refer to FIGS. 11 and 12). A control circuit is formed on the substrate 26 by the control elements 34, 34, • • • , the resistance elements 28, 28, 28, a wiring pattern and the like.

In the meantime, the control elements 34, 34, • • • and the resistance elements 28, 28, 28 are preferably disposed at positions spaced as far as possible from the light emitting elements 29, 29 and the camera module 30 within a range in which the substrate 26 is not unnecessarily enlarged. When the control elements 34, 34, • • • and the resistance elements 28, 28, 28 are disposed at the positions spaced from the light emitting elements 29, 29 and the camera module 30, an influence of heats generated from the control elements 34, 34, • • • and the resistance elements 28, 28, 28 on the light emitting elements 29, 29 and the camera module 30 can be reduced, so that it is possible to secure favorable driving states of the light emitting elements 29, 29 and the camera module 30.

As described above, the connector 27 and the light emitting elements 29, 29 are disposed on the front surface 26a and the rear surface 26b of the substrate 26, which are opposite surfaces, the connector 27 is disposed at one end portion in the longitudinal direction, and the light emitting elements 29, 29 are disposed at the other end portion in the longitudinal direction.

Therefore, since the connector 27 does not exist at the opposite part to the part, on which the light emitting elements 29, 29 are disposed, of the substrate 26, the heats generated upon driving of the light emitting elements 29, 29 are sufficiently radiated from the part of the front surface 26a, which is the opposite part to the part on which the light emitting elements 29, 29 are disposed, so that it is possible to secure the favorable driving states (light emitting states) of the light emitting elements 29, 29, which results from the improvement on the heat radiation.

Also, since a tip end of the camera module 30 mounted to the substrate 26 is located further rearward than the light emitting elements 29, 29, the lights emitted from the light emitting elements 29, 29 are difficult to enter into the camera module 30, so that it is possible to improve a quality of an image to be captured by the camera module 30.

Furthermore, in the vehicle lamp 1, the camera module 30 is mounted to the substrate 26, which the light emitting elements 29, 29 are disposed thereon and is provided so as to feed power to the light emitting elements 29, 29, and the substrate 26 is used in common as a substrate for feeding power to both the light emitting elements 29, 29 and the camera module 30. In particular, in the vehicle lamp 1, a power supply circuit (GND, VCC) can be used as a common line.

Therefore, the number of components can be reduced and an internal space of the outer housing 4 is reduced, so that it is possible to reduce a size of the vehicle lamp 1 and to save the manufacturing cost thereof.

Also, the light emitting elements 29, 29 and the camera module 30 are disposed on the rear surface 26b of the substrate 26, so that the light emitting elements 29, 29 and the camera module 30 are disposed on the same surface of the substrate 26.

In this way, since the light emitting elements 29, 29 and the camera module 30 are disposed on the same surface of the substrate 26, it is possible to closely form a wiring pattern for the light emitting elements 29, 29 and a wiring pattern for the camera module 30 or to use the wiring pattern in common, so that it is possible to easily form the substrate 26 and to save the manufacturing cost.

As described above, the substrate 26 having the connector 27, the light emitting elements 29, 29, the camera module 30 and the like disposed thereon is inserted into the case part 6 of the housing 2 from the end portion at which the connector 27 is disposed, and is disposed in the housing 2 (refer to FIG. 5). The substrate 26 is contacted to the restraint protrusions 13a, 13a of the bottom surface part 13 at one end face thereof in the longitudinal direction (the right and left direction), so that the substrate is positioned relative to the housing 2 in the longitudinal direction. Also, both the upper and lower end portions of the front surface 26a are contacted to the receiving surfaces 14a, 14a of the positioning protrusions 14, 14 of the front surface part 11, so that the substrate 26 is positioned relative to the housing 2 in a thickness direction (the front and back direction).

Furthermore, both the upper and lower surfaces of the substrate 26 are contacted with being pressed to the pressing surface 14b, 14b of the positioning protrusions 14, 14 of the front surface part 11, so that the substrate is positioned relative to the housing 2 in a width direction (the upper and lower direction).

At a state where the substrate 26 is inserted in the case part 6, a tip end portion of the connector 27 is located in the arrangement opening 11c formed in the front surface part 11, the camera module 30 is located further laterally (outward) than the rear surface part 12, and the lens 32 located at the rearmost side with the translucent cover 3 being mounted to the housing 2 is located with facing the transmission window 23a of the translucent cover 3.

In the meantime, at the state where the substrate 26 is inserted in the case part 6, the tip end portion of the connector 27 is located in the arrangement opening 11c formed in the front surface part 11 and does not protrude forward beyond the front surface part 11. When mounting the vehicle lamp 1 to the vehicle body 101, the case part 6 of the housing 2 is inserted in an insertion hole 102a of the side surface 102 but the connector 27 does not protrude forward beyond the front surface part 11. Therefore, upon the insertion of the case part 6 into the insertion hole 102a, the connector 27 is not contacted to the side surface 102. Therefore, it is possible to smoothly and easily mount the vehicle lamp 1 to the vehicle body 101, so that it is possible to improve the operability when mounting the vehicle lamp 1 to the vehicle body 101.

As described above, since the front surface part 11 and the protrusion part 8 continuing to the front surface part 11 are slightly inclined obliquely downward with respect to the vertical direction, the substrate 26 is disposed with being slightly inclined obliquely downward with respect to the vertical direction along the front surface part 11 and the protrusion part 8 (refer to FIG. 7). Therefore, at the state where the vehicle lamp 1 is mounted to the vehicle body 101, an optical axis P of the camera module 30 is slightly inclined obliquely downward with respect to the horizontal direction.

Also, as described above, since the front surface part 11 and the protrusion part 8 are inclined so that the inner end portions thereof in the right and left direction are located slightly further rearward than the outer end portions, the substrate 26 is disposed with being inclined along the front surface part 11 and the protrusion part 8 in the right and left direction, too (refer to FIG. 5). Therefore, at the state where the vehicle lamp 1 is mounted to the vehicle body 101, the optical axis P of the camera module 30 is slightly inclined outward with respect to the front and back direction.

At the state where the substrate 26 is inserted in the case part 6, the end portion of the substrate 26 in the longitudinal direction, at which the camera module 30 is mounted, is located slightly further laterally (outward) than the protrusion part 8.

In the meantime, the substrate 26 has a dark color such as black, dark blue, green or the like. The substrate 26 has a dark color, so that the lights emitted from the light emitting elements 29, 29 are difficult to be reflected on the substrate 26. Thereby, it is possible to prevent the unnecessary reflection of the lights. In particular, since the lights emitted from the light emitting elements 29, 29 are difficult to be reflected on the substrate 26, the lights emitted from the light emitting elements 29, 29 are difficult to enter into the camera module 30, so that it is possible to improve a quality of an image to be captured by the camera module 30.

Figure 13:
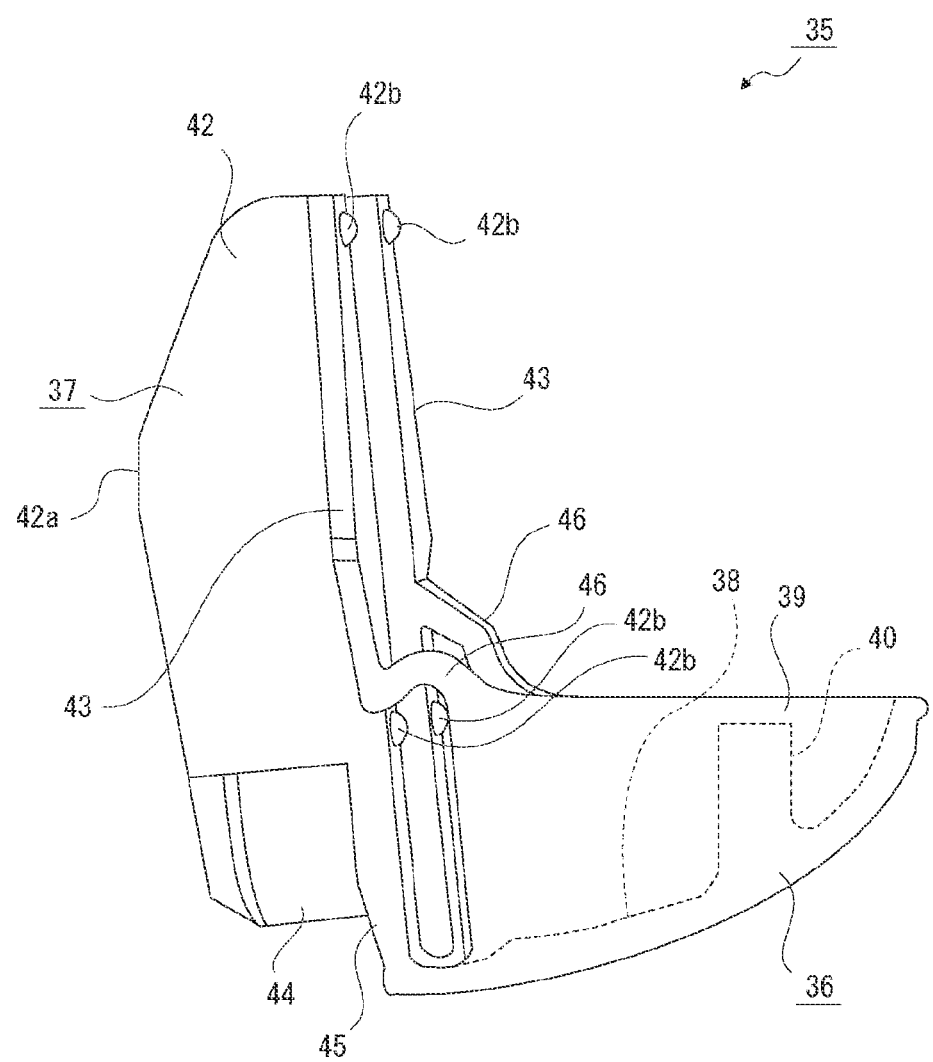
FIG. 13 is a plan view of a pressing member.

In the outer housing 4, a pressing member 35 is disposed and the substrate 26 is pressed by the pressing member 35. The respective parts of the pressing member 35 are integrally formed by a resin material, and the pressing member has a pressing part 36 and a functioning part 37 (refer to FIGS. 2, 5 and 13).

The pressing part 36 has a case shape opening laterally as a whole, and has a base surface part 38 having a curved surface shape, facing surface parts 39, 39 protruding laterally (inward) from both upper and lower end edges of the base surface part 38, and a shaft part to be mounted 40 protruding from the base surface part 38 in the same direction as the facing surface part 39. The base surface part 38 has a substantially laterally (outward) convex curved surface shape. The facing surface parts 39, 39 are located with facing each other in the upper and lower direction. The shaft part to be mounted 40 protrudes from a substantially central portion of the base surface part 38 and has a cylindrical shape.

The functioning part 37 has a base surface part 41 facing in the front and back direction, pressing surface parts 42, 42 protruding forward from both upper and lower end edges of the base surface part 41 and facing in the front and back direction, coupling surface parts 43, 43 protruding upward or downward from front edges of the pressing surface parts 42, 42, and a covering surface part 44 continuing to one side edge (outer edge) of the base surface part 41.

A length of each of the pressing surface parts 42, 42 in the right and left direction is greater than a length of the base surface part 41 in the right and left direction, and portions thereof protrude further laterally (inward) than the base surface part 41. The pressing surface parts 42, 42 are formed at portions, which continue to the base surface part 41, of rear surfaces thereof with contact surfaces 42a, 42a. The contact surface 42a is located at a substantially central portion of the pressing surface part 42 in the right and left direction, and faces rearward.

The pressing surface parts 42, 42 are provided on front surfaces thereof with two pressing protrusions 42b, 42b spaced in the right and left direction, respectively. The pressing protrusion 42b has a forward convex semi-spherical shape, for example.

The coupling surface parts 43, 43 have a shape extending in the right and left direction and face in the front and back direction.

The covering surface part 44 has a semicircular arc shape opening laterally (inward). The covering surface part 44 continues to the base surface part 41 and the pressing surface parts 42, 42, and the pressing member 35 is formed with a circular capturing hole 35a penetrating in the front and back direction by the base surface part 41 and the pressing surface part 44.

A front end portion of one end portion in the right and left direction of the pressing surface part 42 of the functioning part 37 and one end portion in the right and left direction of the covering surface part 44 are coupled by a rear end portion of the base surface part 38 and coupling protrusions 45, 45, 45. The coupling protrusions 45, 45, 45 are spaced in the upper and lower direction.

One end portions in the right and left direction of the coupling surface parts 43, 43 of the functioning part 37 are coupled by rear end portions of the facing surface parts 39, 39 and coupling part 46, 46. The coupling part 46, 46 protrude from rear end portions of one end portions in the right and left direction of the facing surface parts 39, 39.

The pressing member 35 is formed with light transmission holes 35b, 35b penetrating in the front and rear direction and spaced in the upper and lower direction between the coupling protrusions 45, 45, 45. The lights emitted from the light emitting elements 29, 29 pass through the light transmission holes 35b, 35b. Therefore, a part of the pressing member 35 around the light transmission holes 35b, 35b functions as a light shield part for shielding portions of the lights emitted from the light emitting elements 29, 29.

In this way, the pressing member 35 is provided with a light shield part for shielding portions of the lights emitted from the light emitting elements 29, 29. Therefore, the pressing member 35 configured to press the substrate 26 and to position the same relative to the housing 2 functions as a shade for shielding portions of the lights emitted from the light emitting elements 29, 29, so that it is possible to simplify the structure and to save the manufacturing cost by reducing the number of components of the vehicle lamp 1.

The pressing member 35 is disposed in the outer housing 4 with a part thereof being inserted in the case part 6 of the housing 2 (refer to FIG. 5). The pressing member 35 is mounted to the housing 2 by screwing a mounting screw 500 inserted in the screw insertion hole 15a of the base part 15 into the shaft part to be mounted 40.

When a part of the pressing member 35 is inserted in the case part 6, one end face of the substrate 26 in the longitudinal direction is pressed laterally (inward) by a portion of the base surface part 38 of the pressing member 35, and the other end face of the substrate 26 in the longitudinal direction is pressed to the restraint protrusions 13a, 13a provided for the bottom surface part 13 of the housing 2, so that the positioning of the substrate 26 relative to the housing 2 in the longitudinal direction is completed.

Also, when a part of the pressing member 35 is inserted in the case part 6, the contact surfaces 42a, 42a are contacted to the inner surface of the rear surface part 12 of the housing 2, and the rear surface part 12 is pressed rearward by the pressing member 35, so that the pressing member 35 is applied with a forward reaction from the rear surface part 12. By the reaction to the pressing member 35 from the rear surface part 12, the substrate 26 is pressed forward by the pressing protrusions 42b, 42b, • • •, so that both the upper and lower end portions of the front surface 26a of the substrate 26 are respectively pressed to the receiving surfaces 14a, 14a of the positioning protrusion 14. Therefore, the positioning of the substrate 26 in the thickness direction (the front and back direction) is completed.

In this way, the vehicle lamp 1 is provided with the pressing member 35, which is disposed in the outer housing 4 and is mounted to the housing 2, and the substrate 26 is pressed by the pressing member 35 and is thus positioned relative to the housing 2.

Therefore, when the pressing member 35 is mounted to the housing 2, the substrate 26 is positioned relative to the housing 2, so that it is possible to easily position the substrate 26 relative to the housing 2 and to easily and securely dispose the light emitting elements 29, 29 and the camera module 30 on the substrate 26 in the necessary directions.

At the state where the substrate 26 is positioned relative to the housing 2 by the pressing member 35, the light emitting elements 29, 29 are located right in front of the light transmission holes 35b, 35b of the pressing member 35, and the light emitting elements 29, 29, the light transmission holes 35b, 35b and the emission surface part 22 of the translucent cover 3 are sequentially located side by side in the front and back direction. In the meantime, the emission surface part 22 is located with being inclined relative to the optical axes of the light emitting elements 29, 29.

Also, at the state where the substrate 26 is positioned relative to the housing 2 by the pressing member 35, the camera module 30 is located right in front of the capturing hole 35a of the pressing member 35, and the camera module 30, the capturing hole 35a and the transmission window 23a of the translucent cover 3 are sequentially located side by side in the front and back direction.

Upon the capturing, the capturing light having passed through the transmission window 23a is incident on the lens 32 of the camera module 30 through the capturing hole 35a. In the meantime, the rear surface part 12 of the housing 2 located right beside the transmission window 23a is not provided with the positioning rib 17. Therefore, while passing through the transmission window 23a, the capturing light is not shielded by a part of the housing 2, so that it is possible to easily set an angle of view necessary for the camera module 30.

Furthermore, at the state where the substrate 26 is positioned relative to the housing 2 by the pressing member 35, a part of the housing 2 including the protrusion part 8, a part of the substrate 26, the light emitting elements 29, 29 and the camera module 30 are covered from the side (the outer side) by the pressing part 36 of the pressing member 35.

Therefore, the pressing part 36 functions as an extension for shading the structure disposed in the outer housing 4, too. Thereby, when the vehicle lamp 1 is seen from the outside, the structure disposed in the outer housing 4 is difficult to be seen through the translucent cover 3, so that it is possible to improve the appearance of the vehicle lamp 1.

Also, the pressing member 35 positions the substrate 26 relative to the housing 2 and the pressing part 36 functions as an extension, so that it is not necessary to separately provide a positioning member and an extension. As a result, it is possible to simplify the structure and to save the manufacturing cost by reducing the number of components of the vehicle lamp 1.

In the vehicle lamp 1 configured as described above, when the lights are emitted from the light emitting elements 29, 29, the emitted lights are incident on the emission surface part 22 of the translucent cover 3 through the light transmission holes 35b, 35b of the pressing member 35, are controlled by the optical steps 22a, 22a, • • • of the emission surface part 22 and are illuminated to a region ranging from the rear to the side.

At this time, since the two light emitting elements 29, 29 spaced in the upper and lower direction are disposed in the vehicle lamp 1, it is possible to easily illuminate the lights at a predetermined emission angle in the upper and lower direction. In particular, it is necessary to illuminate the light from the side turn signal lamp at an angle of 15° or greater in the upper and lower direction on the basis of the horizontal direction, due to the regulations. The two light emitting elements 29, 29 are disposed with being spaced in the upper and lower direction, so that it is possible to easily and sufficiently illuminate the lights, satisfying the illumination angle of the regulations. Like this, according to the vehicle lamp 1, since it is possible to easily and sufficiently illuminate the lights, satisfying the illumination angle of the regulations, it may be possible to omit the optical steps 22a, 22a, • • • of the emission surface part 22.

In the meantime, when the camera module 30 is operated in the vehicle lamp 1, the capturing is performed by the camera module 30. The capturing is respectively performed by the camera module 30 of the vehicle lamp 1 disposed on the left side surface 102 of the vehicle 100 and the camera module 30 of the vehicle lamp 1 disposed on the right side surface 102 of the vehicle 100. The images (video pictures) captured by the camera modules 30, 30 are respectively displayed on screens of the displays 200, 200 disposed in the vehicle interior, as left image and right images.

Figure 14:
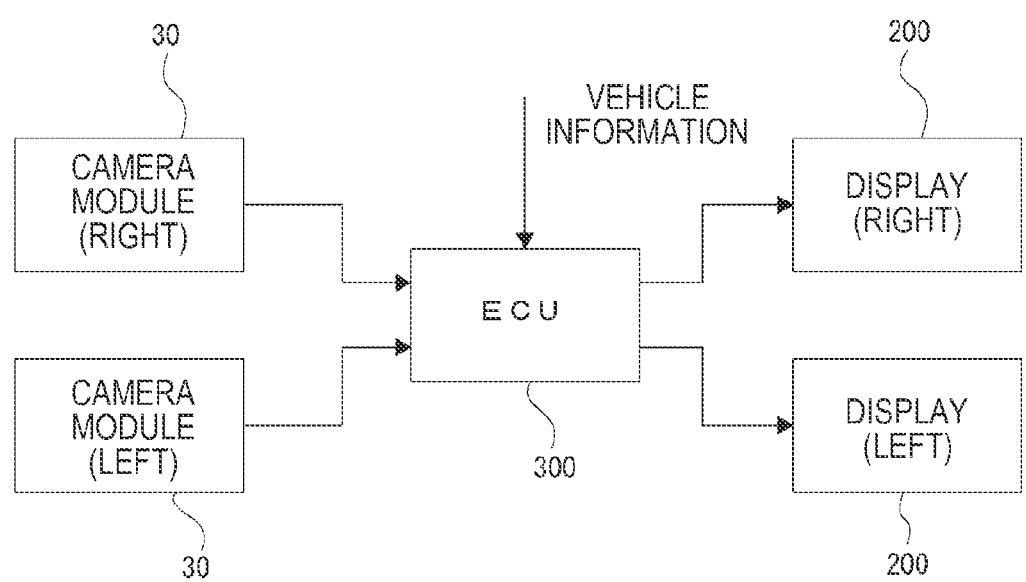
FIG. 14 is a block diagram depicting a relation of a camera module, an ECU and a display.

When the capturing is performed by the right camera module 30 and the left camera module 30, respectively, the capturing lights are respectively photoelectrically converted by the image pickup elements 33, 33, and capturing signals are transmitted to an ECU (electronic control unit) 300 (refer to FIG. 14). The ECU 300 transmits image signals based on the input capturing signals to the displays 200, 200, so that the right and left images are respectively displayed on the respective screens of the right display 200 and the left display 200.

The respective information about the vehicle 100 is also input to the ECU 300, so that respective controls such as engine control, automatic control, driving control, braking control and the like are also performed in correspondence to command signals transmitted from the ECU 300 to the respective units on the basis of the respective information.

A driver can perceive a situation of the region ranging from the rear to the side and drive the vehicle in correspondence to the perceived situation by visually recognizing the left image and the right image displayed on the screens of the displays 200, 200.

As described above, the vehicle lamp 1 is provided with the substrate 26 disposed in the outer housing 4 and the camera module 30 and light emitting elements 29, 29 disposed on the substrate 26.

Therefore, a chassis and a holder are not disposed in the outer housing 4, and both the light emitting elements 29, 29 and the camera module 30 are disposed on the substrate 26 disposed in the outer housing 4. Thus, the number of the constitutional components is small, so that it is possible to reduce the number of components of the vehicle lamp 1 and the size thereof.

In the meantime, the inner surface of the translucent cover 3 may be clouded depending on a temperature difference between the inside of the outer housing 4 and the outside of the outer housing 4. Regarding this, the inner surface of the translucent cover 3 may be subjected to an anti-fogging treatment for solving or preventing fogging.

Figure 15:
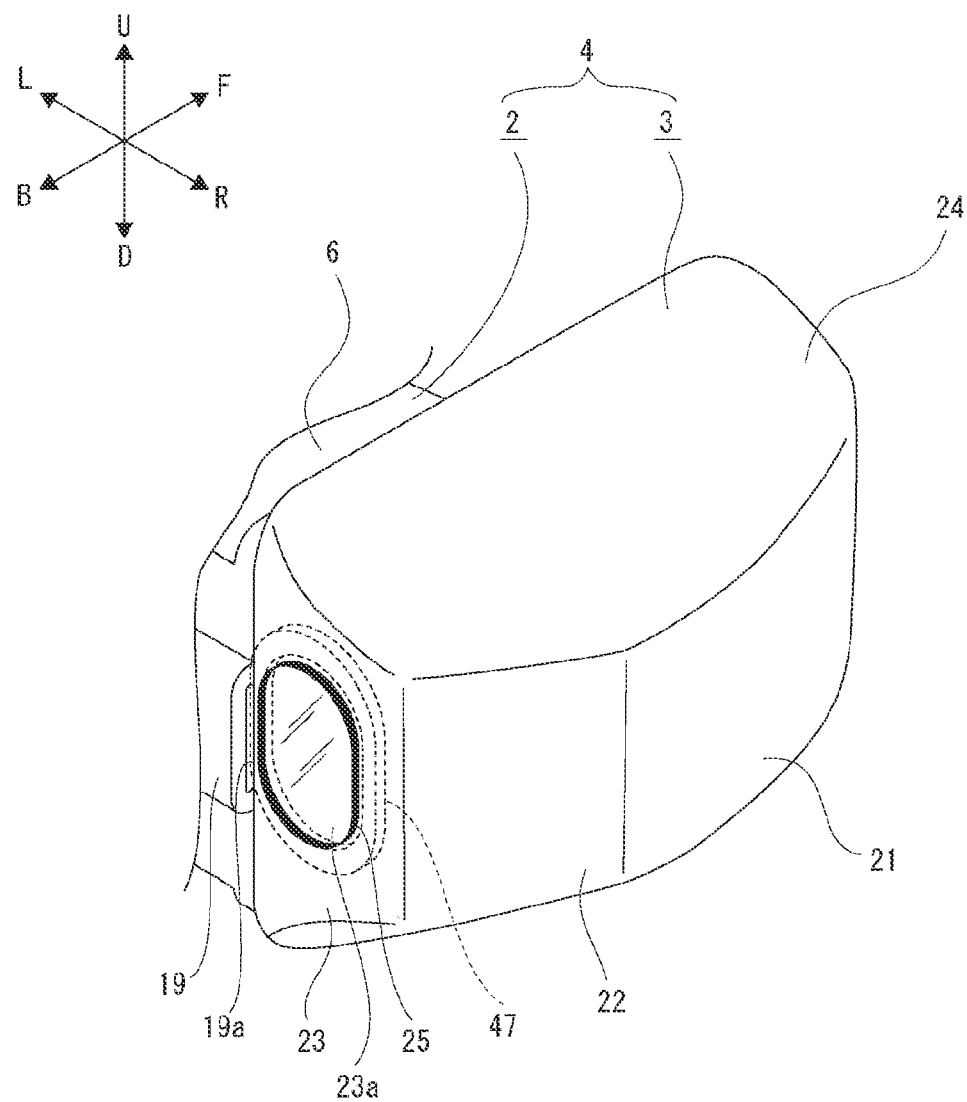
FIG. 15 is an enlarged perspective view depicting an example where a heater is disposed at an outer periphery-side of a transmission window.

Also, a heater 47 may be disposed at the outer peripheryside of the transmission window 23a of the flat plate surface part 23 of the translucent cover 3 (refer to FIG. 15). The heater 47 is embedded in the translucent cover 3 or is attached to the outer or inner surface of the translucent cover 3 by an adhesive or the like. The power is fed to the heater 47 by the control circuit formed on the substrate 26. As the heater 47, a line heater configured to generate heat as the power is fed thereto can be used.

The heater 47 is disposed at the translucent cover 3, so that it is possible to melt snow on the transmission window 23a of the translucent cover 3. Therefore, the appropriate incidence of the capturing light on the camera module 30 from the transmission window 23a is not disturbed by the snow, so that it is possible to improve a quality of an image to be captured by the camera module 30. Also, the heater 47 is disposed at the translucent cover 3, so that it is possible to solve or prevent the fogging on the inner surface of the translucent cover 3.

Figure 16:
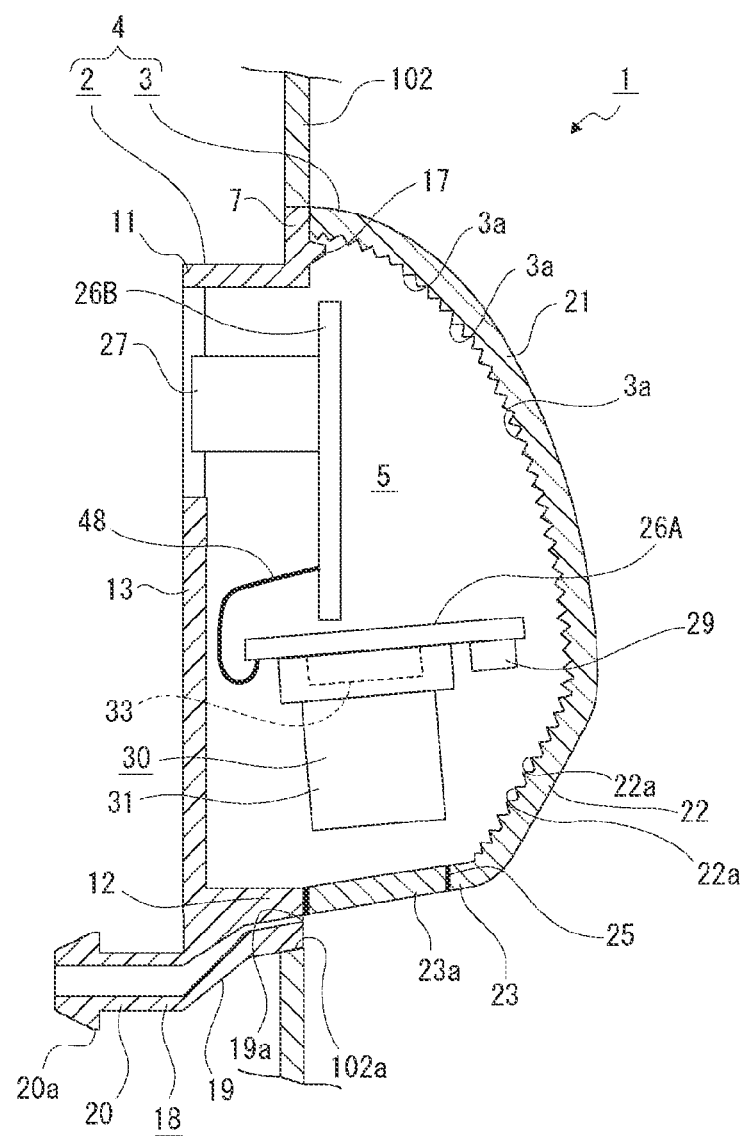
FIG. 16 is a sectional view depicting a vehicle lamp in which the substrate is divided into two substrates.

In the above, the connector 27, the light emitting elements 29, 29 and the camera module 30 are disposed on one substrate 26 disposed in the outer housing 4. However, the substrate 26 may be divided into a first substrate 26A and a second substrate 26B (refer to FIG. 16).

The first substrate 26A and the second substrate 26B are connected by a flexible printed wiring board 48. The first substrate 26A is disposed to face in the front and back direction, and the light emitting elements 29, 29 and the camera module 30 are disposed on a rear surface of the first substrate 26A. The second substrate 26B is disposed to face in the right and left direction in front of the first substrate 26A, the control circuit is formed on one surface of the second substrate 26B and the connector 27 is disposed on the other surface. The first substrate 26A and the second substrate 26B are pressed by a pressing member (not shown) and are thus positioned relative to the housing 2.

In this way, the substrate 26 is divided into the first substrate 26A and the second substrate 26B, and the first substrate 26A and the second substrate 26B are disposed back and forth to face in the different directions, so that the parts of the vehicle lamp 1 to be inserted in the vehicle 100 can be made small. Therefore, it is possible to reduce the size of the vehicle lamp 1.

In the above, the substrate 26 is divided into the two substrates of the first substrate 26A and the second substrate 26B. However, the substrate 26 may be divided into three or more substrates, and the necessary components may be respectively disposed on the respective substrates.

Figure 17:
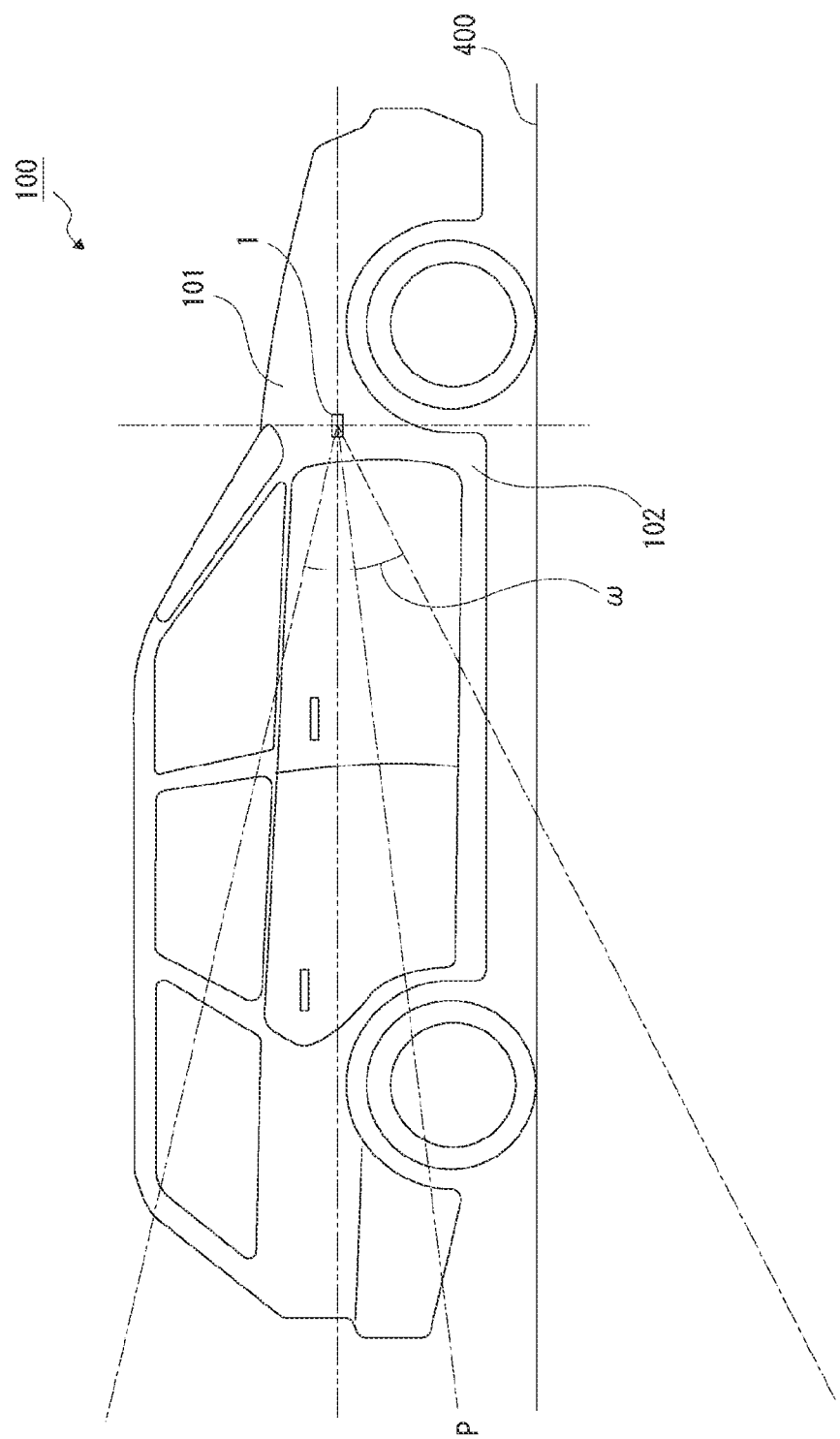
FIG. 17 is a side view depicting an angle of view of the camera module.

As described above, in the vehicle lamp 1, the substrate 26 is disposed with being slightly inclined obliquely downward with respect to the vertical direction along the front surface part 11 and the protrusion part 8, and at the state where the vehicle lamp 1 is mounted to the vehicle body 101, the optical axis P of the camera module 30 is slightly inclined obliquely downward with respect to the horizontal direction (refer to FIGS. 7 and 17).

An angle of view w of the camera module 30 in the upper and lower direction is set to 40°, for example, and the optical axis P is inclined obliquely downward with respect to the horizontal direction, so that the angle of view w is set to 13° at the upper side and 27° at the lower side on the basis of the horizontal direction.

In this way, the optical axis P of the camera module 30 is inclined further downward than the horizontal direction, so that the capturing range of the camera module 30 at the lower side increases. As a result, it is possible to easily check a situation of a road surface 400, so that it is possible to improve the visibility. For example, it is possible to favorably recognize recesses, parking lines (white lines) and the like in the vicinity of rear wheels of the vehicle 100, so that the convenience is improved when traveling rearward, and the safety is improved upon the traveling.

In the meantime, since the angle of view w of the camera module 30 is set to 13° at the upper side on the basis of the horizontal direction, the sufficient capturing range is secured even at the upper side, the visibility for a vehicle, a pedestrian and the like existing at the rear is also favorable, and the safety can be secured upon the traveling.

In the above, the angle of view w of the camera module 30 is set to 40° and the optical axis P is set to be downward by 7°. However, the angle of view w and the direction of the optical axis P are not limited to 40° and the downward direction of 7°. For example, the angle of view w and the optical axis P of the camera module 30 can be arbitrarily set inasmuch as the favorable visibility can be secured in the upper and lower direction and the safety can be secured upon the traveling of the vehicle 100.

Also, as described above, the camera module 30 has the rectangular image pickup element 33, is mounted on the substrate 26 in the direction in which the longitudinal direction thereof is the upper and lower direction, and is disposed in the direction in which the longitudinal direction of effective incident region of the capturing light is the upper and lower direction.

Therefore, since it is possible to capture a vertically long image by the camera module 30, the angle of view is sufficiently secured in the upper and lower direction, so that the capturing range of the camera module 30 in the upper and lower direction increases and the visibility can be thus improved.

Also, the image pickup element 33 is disposed in the direction in which the longitudinal direction of the effective incident region of the light is the upper and lower direction. Thereby, it is possible to set the large angle of view of 40°, to save the manufacturing cost and to improve the visibility.

In the meantime, as described above, since the optical axis P of the camera module 30 is inclined further downward than the horizontal direction, the camera module 30 is also inclined further downward than the horizontal direction as much as that (refer to FIG. 7). However, since the transmission window 23a of the translucent cover 3 is formed to have the vertically long oval shape, the lens 32 located at the rearmost side of the camera module 30 is located to face the lower end portion of the transmission window 23a (refer to FIG. 9).

Therefore, the capturing light is not incident on the lens 32 through a part except for the transmission window 23a, so that it is possible to improve a quality of an image to be captured by the camera module 30.

Also, if the transmission window 23a is formed to have a circular shape, the transmission window 23a is located at the lower end-side of the flat plate surface part 23, so that the appearance is deteriorated. However, when the transmission window 23a is formed to have a shape such as an oval shape that is long in the upper and lower direction and is symmetric with respect to the upper and lower direction, the transmission window 23a can be formed at a position of the flat plate surface part 23 that is symmetric with respect to the upper and lower direction, so that it is possible to improve the appearance.

Furthermore, the transmission window 23a is formed to have a shape that is symmetric with respect to the upper and lower direction, so that the same translucent cover 3 can be used for the vehicle lamp 1 to be disposed at the left of the vehicle and the vehicle lamp 1 to be disposed at the right. Thereby, the components of the vehicle lamp 1 can be used in common, so that it is possible to save the manufacturing cost.

Figure 18:
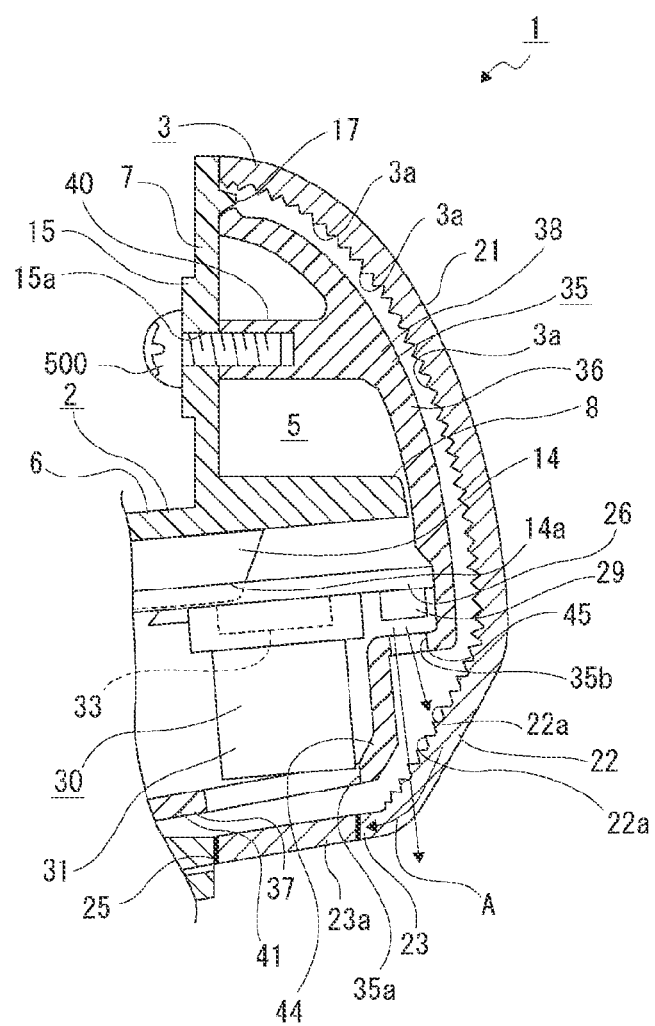
FIG. 18 is a sectional view depicting a function of a light shield part provided at the translucent cover.

In the meantime, the light emitting elements 29, 29 and the camera module 30 are disposed in the outer housing 4, the lights are emitted from the light emitting elements 29, 29 and the capturing lights are incident on the camera module 30. The lights emitted from the light emitting elements 29, 29 are illuminated outside through the translucent cover 3. However, upon the emission of the lights from the light emitting elements 29, 29, the emitted lights may be guided toward the transmission window 23a along the inside of the translucent cover 3 (refer to an arrow A in FIG. 18).

Therefore, as described above, the translucent cover 3 is provided with the light shield part 25 at the position covering the outer periphery of the transmission window 23a.

Therefore, upon the emission of the lights from the light emitting elements 29, 29, the lights guided along the inside of the translucent cover 3 are shielded not to enter into the transmission window 23a by the light shield part 25 and the lights emitted from the light emitting elements 29, 29 are prevented from entering into the camera module 30, so that it is possible to improve a quality of an image to be captured by the camera module 30.

Also, as described above, in the vehicle lamp 1, the substrate 26 is disposed with being inclined along the front surface part 11 and the protrusion part 8 in the right and left direction, and at the state where the vehicle lamp 1 is mounted to the vehicle body 101, the optical axis P of the camera module 30 is slightly inclined laterally outward in the front and back direction (refer to FIG. 5).

Therefore, an image ranging from the rear of the vehicle to the rearward and obliquely lateral side (outer side) is captured by the camera module 30, so that the favorable visibility for a vehicle, a pedestrian and the like existing in the region ranging from the rear of the vehicle to the rearward and obliquely lateral side (outer side) is secured and the traveling safety can be secured.

Like this, the optical axis P of the camera module 30 is slightly inclined laterally outward in the front and back direction. However, a predetermined angle of view is set for the camera module 30 in the right and left direction, too, so that a part of the side surface 102 of the vehicle body 101 is captured by the camera module 30 and a part of the captured side surface 102 is displayed on the screen of the display 200.

The part of the captured side surface 102 is displayed on the screen of the display 200, so that when the driver or the like visibly recognizes the image being captured, the driver or the like can clearly recognize the capturing region and the safe driving and the like can be thus secured.

Figure 19:
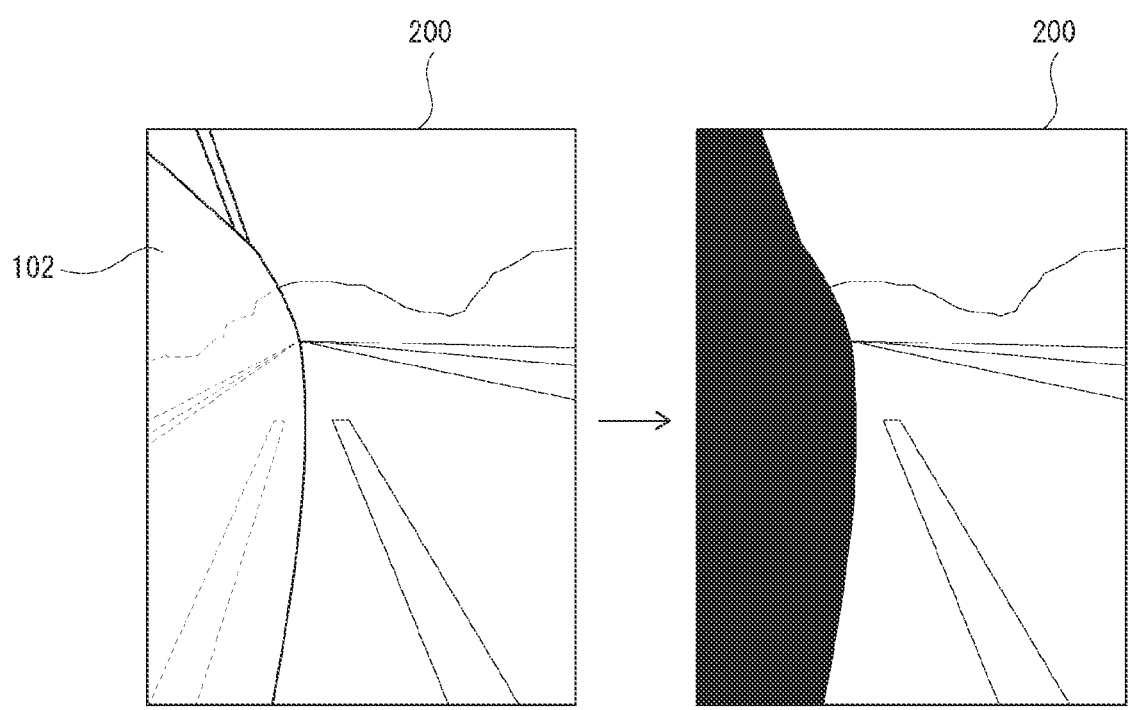
FIG. 19 depicts states before and after a side surface to be displayed in an image is covered.

However, a surrounding scene or a road surface may be projected on the side surface 102 of the vehicle body 101, depending on external environments and the like (refer to the left of FIG. 19), so that the driver or the like may falsely recognize the projected scene or road surface as a true scene or road surface, which causes a problem with respect to the safe driving.

Therefore, in order to prevent the false recognition, the vehicle lamp 1 is configured so that the side surface 102 is covered or the outer edge of the side surface 102 is emphasized on the screen of the display 200 by an image distinction means 50 so as to make a visual distinction between the side surface 102 and a part except for the side surface 102.

In the below, each example of the image distinction means 50 and each processing to be performed by the image distinction means 50 are described (refer to FIGS. 19 to 27).

Figure 20:
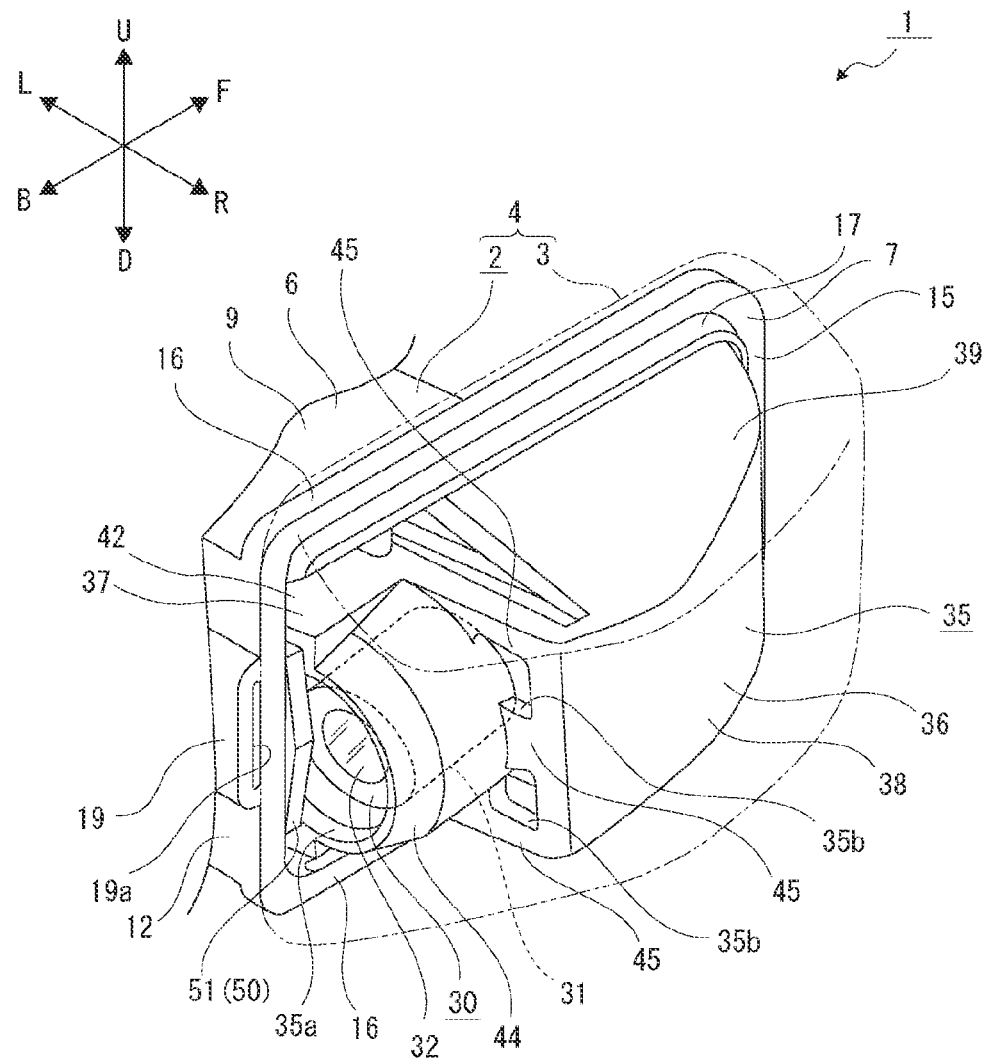
FIG. 20 is a perspective view depicting an example where a housing is provided with a shade, as an image distinction means.
Figure 21:
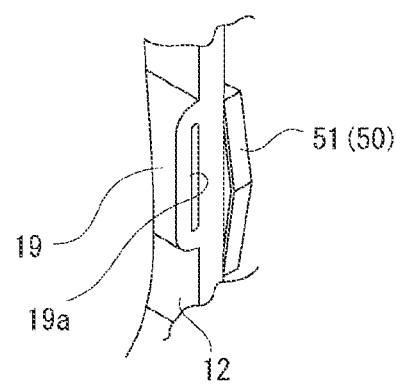
FIG. 21 is a perspective view depicting another example where the housing is provided with the shade, as the image distinction means.
Figure 22:
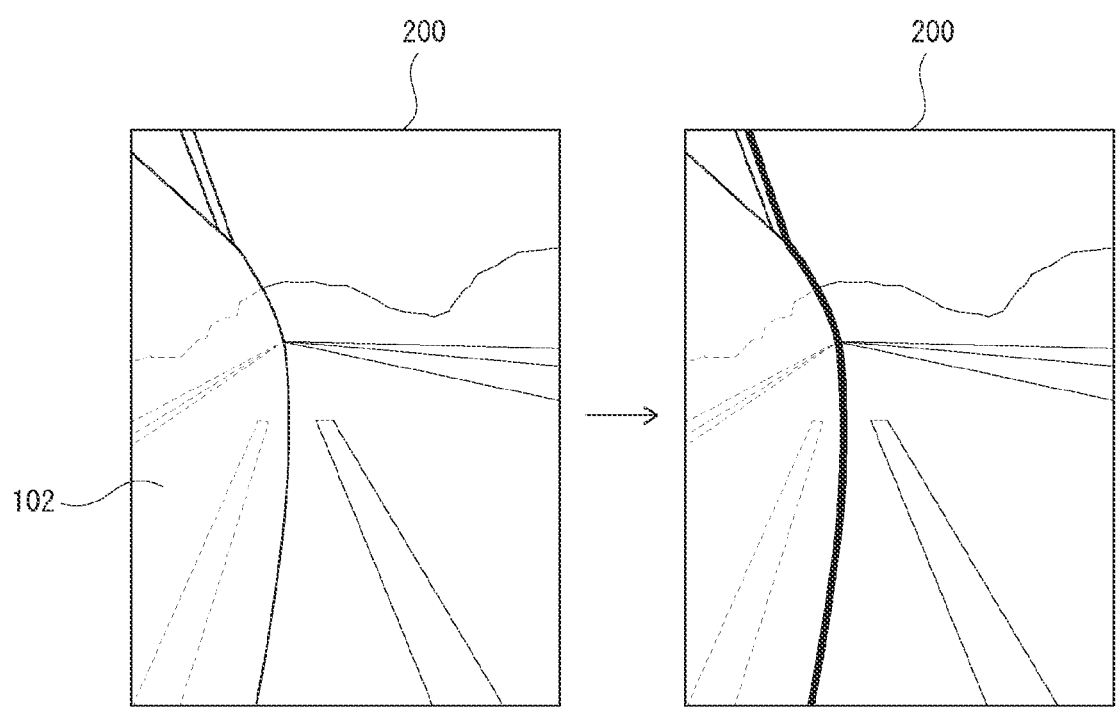
FIG. 22 depicts states before and after an outer edge of a side surface to be displayed in an image is covered.

A first example of the image distinction means 50 is that a plate-shaped shade 51 is provided as the image distinction means 50 (refer to FIG. 20). The shade 51 is provided at the housing 2, for example, and protrudes laterally from the rear surface part 12. By the shade 51, the capturing light for capturing the side surface 102 is shielded.

Therefore, an image in which the side surface 102 is covered by the shade 51 is displayed on the screen of the display 200 (refer to the right of FIG. 19), so that the side surface 102 and a part except for the side surface 102 are visually distinguished.

In the meantime, the shade 51 may be provided at the translucent cover 3, the pressing member 35 or the lens tube 31 of the camera module 30.

Also, the shade 51 may be formed to have a line shape (refer to FIG. 21) covering the outer edge of the side surface 102. In this case, an image in which the outer edge of the side surface 102 is covered and emphasized by the shade 51 is displayed on the screen of the display 200 (refer to FIG. 22), so that the side surface 102 and a part except for the side surface 102 are visually distinguished.

As described above, the shade 51 configured to shield a part of the capturing light incident on the camera module 30 is provided as the image distinction means 50, so that a part of the capturing light is shielded by the shade 51 and the side surface 102 and a part except for the side surface 102 are thus visually distinguished. Therefore, the side surface 102 and a part except for the side surface 102 are visually distinguished by the simple configuration, so that it is possible to save the manufacturing cost by the simplification of the structure of the vehicle lamp 1.

Also, the shade 51 may be formed integrally with the housing 2. When the shade 51 is formed integrally with the housing 2, the side surface 102 and a part except for the side surface 102 are visually distinguished without increasing the number of components, and the number of components of the vehicle lamp 1 is reduced, so that it is possible to further simplify the structure and to further save the manufacturing cost.

Figure 23:
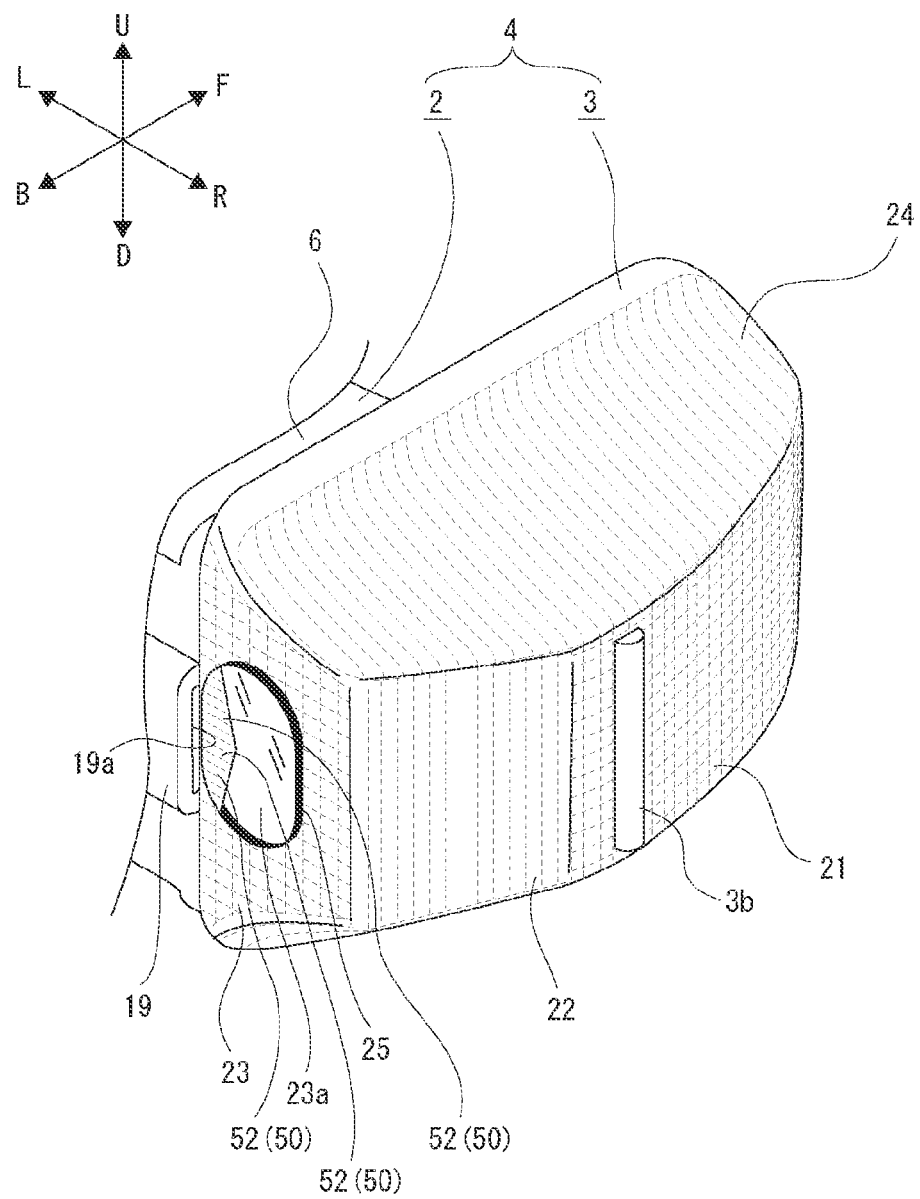
FIG. 23 is a perspective view depicting an example where the translucent cover is formed with a step, as the image distinction means.
Figure 24:
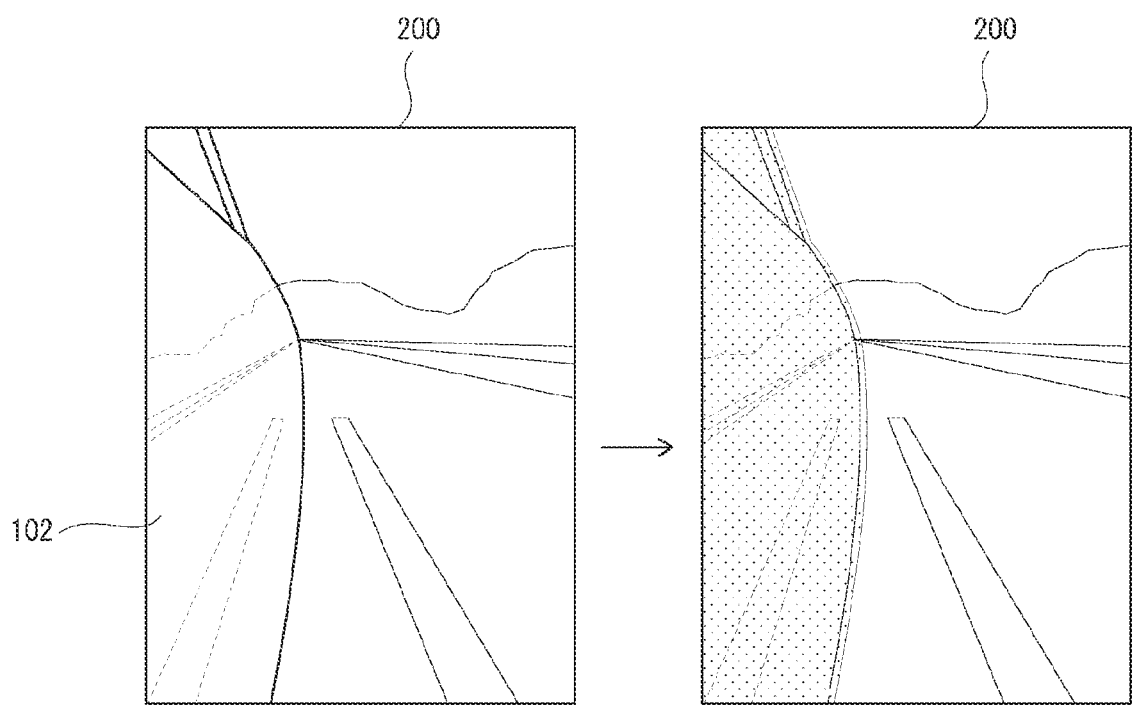
FIG. 24 depicts states where a side surface to be displayed in an image is clear and unclear.

A second example of the image distinction means 50 is that the transmission window 23a of the translucent cover 3 is formed with steps 52, 52, • • •, as the image distinction means 50 (refer to FIG. 23). The capturing light having captured the side surface 102 is incident on the steps 52, 52, • • •.

Therefore, a blurred image in which the side surface 102 is made unclear by the steps 52, 52, • • • is displayed on the screen of the display 200 (refer to FIG. 24), so that the side surface 102 and a part except for the side surface 102 are visually distinguished.

As described above, the steps 52, 52, • • • configured to shield a part of the capturing light incident on the camera module 30 are provided as the image distinction means 50, so that a part of the capturing light incident on the camera module 30 is controlled by the steps 52, 52, • • • and the side surface 102 and a part except for the side surface 102 are thus visually distinguished. Therefore, the side surface 102 and a part except for the side surface 102 are visually distinguished by the simple configuration, so that it is possible to save the manufacturing cost by the simplification of the structure of the vehicle lamp 1.

In the meantime, a convex portion 3b functioning as a vortex generator may be provided at the outermost portion of the translucent cover 3 in the right and left direction (refer to FIG. 23). When the translucent cover 3 is provided with the convex portion 3b, a turbulent flow is caused in the air flowing along the surface of the translucent cover 3 upon the traveling of the vehicle 100, and the flowing air is likely to flow along the transmission window 23a, so that it is possible to remove the foreign matters attached on the transmission window 23a upon the traveling of the vehicle 100.

FIG. 23 depicts the convex portion 3b extending in the upper and lower direction and provided on the translucent cover 3. However, a plurality of convex portions may be provided with being spaced in the upper and lower direction.

Figure 25:
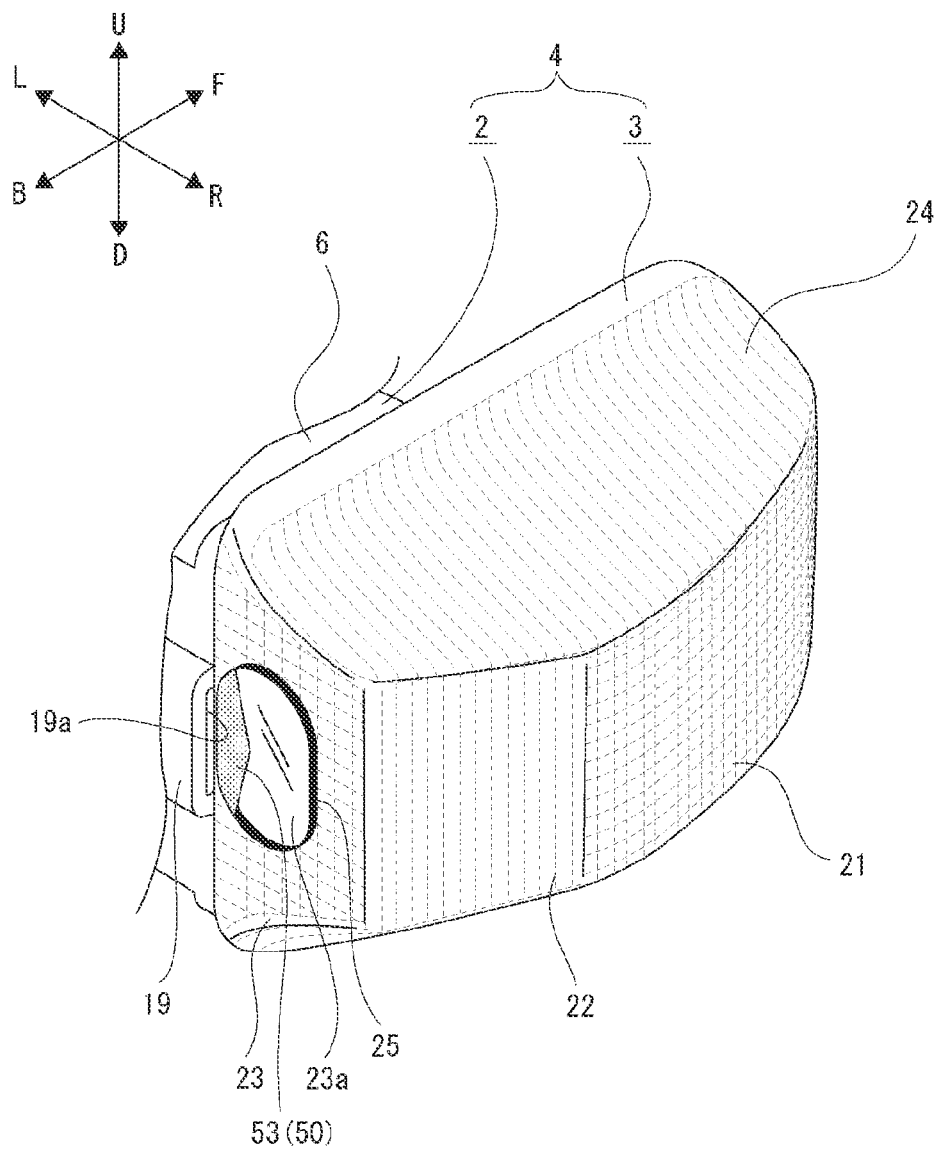
FIG. 25 is a perspective view depicting an example where the translucent cover is provided with a colored part, as the image distinction means.

A third example of the image distinction means 50 is that the transmission window 23a of the translucent cover 3 is formed with a colored part 53 as the image distinction means 50 (refer to FIG. 25). A color of the colored part 53 is arbitrary, and as a material of the colored part 53, a material though which the capturing light can pass is used.

Therefore, an image in which the side surface 102 is colored by the colored part 53 is displayed on the screen of the display 200, so that the side surface 102 and a part except for the side surface 102 are visually distinguished.

The colored part 53 may be formed to have a line shape for coloring only the outer edge of the side surface 102. In this case, an image in which the outer edge of the side surface 102 is colored and emphasized by the colored part 53 is displayed on the screen of the display 200, so that the side surface 102 and a part except for the side surface 102 are visually distinguished.

As described above, the translucent cover 3 is formed with the colored part 53 as the image distinction means 50, so that an image in which the side surface 102 is colored is displayed on the screen and the side surface 102 and a part except for the side surface 102 are thus visually distinguished. Therefore, the side surface 102 and a part except for the side surface 102 are visually distinguished by the simple configuration, so that it is possible to save the manufacturing cost by the simplification of the structure of the vehicle lamp 1.

In the meantime, the colored part 53 may have a color by which the capturing light is shielded or totally reflected without passing through the same. In this case, the side surface 102 is not displayed as an image on the screen of the display 200, so that the side surface 102 and a part except for the side surface 102 are visually distinguished.

Figure 26:
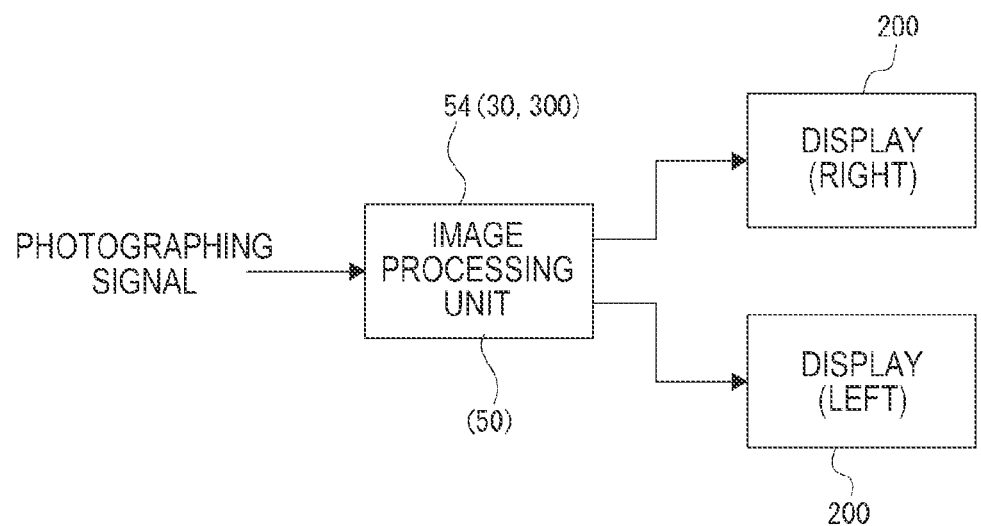
FIG. 26 is a block diagram depicting an example where an image processing unit is provided as the image distinction means.
Figure 27:
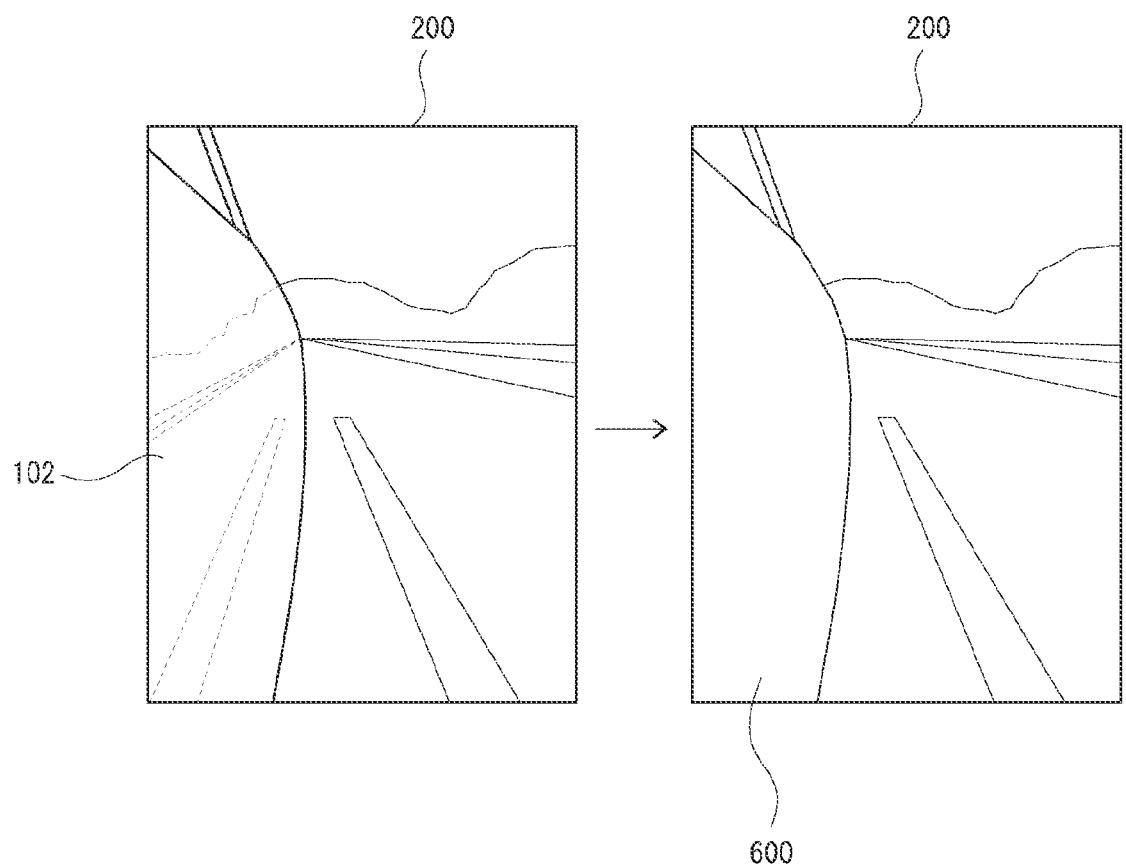
FIG. 27 depicts a state before a side surface to be displayed in an image is processed and a state where a computer graphic image is superimposed on the side surface.

A fourth example of the image distinction means 50 is that an image processing unit 54 is provided as the image distinction means 50 (refer to FIG. 26). The image processing unit 54 may be a signal processing unit provided in the camera module 30 or may be the ECU 300, for example.

A capturing signal is input to the image processing unit 54, and predetermined processing is performed by the image processing unit 54 on the basis of the capturing signal. As the predetermined processing, processing of painting the captured side surface 102 with a predetermined color, processing of painting the outer edge of the captured side surface 102 with a predetermined color, processing of generating a computer graphic image having the same shape as the captured side surface 102 and superimposing the same on the side surface 102 on the screen, processing of generating a computer graphic image having the same shape as the outer edge of the captured side surface 102 and superimposing the same on the outer edge of the side surface 102 on the screen, processing of generating an image of the side surface 102, which has the same shape as the captured side surface 102 and a projection is not generated therein, and superimposing the same on the side surface 102 on the screen, and the like may be exemplified.

For example, when the processing of generating a computer graphic image having the same shape as the captured side surface 102 and superimposing the same on the side surface 102 on the screen is performed, a computer graphic image 600 generated by the image processing unit 54 is displayed on the screen of the display 200 at a part at which the side surface 102 exists (refer to FIG. 27), so that the side surface 102 and a part except for the side surface 102 are visually distinguished.

As described above, the image processing unit 54 configured to process an image captured by the camera module 30 is provided as the image distinction means 50, so that the side surface 102 and a part except for the side surface 102 are visually distinguished by the predetermined image processing performed by the image processing unit 54. Therefore, a degree of freedom of the image processing aspect is increased by the image processing unit 54, so that it is possible to increase the degree of design freedom and to improve the visibility of the image to be displayed on the screen.

Figure 28:
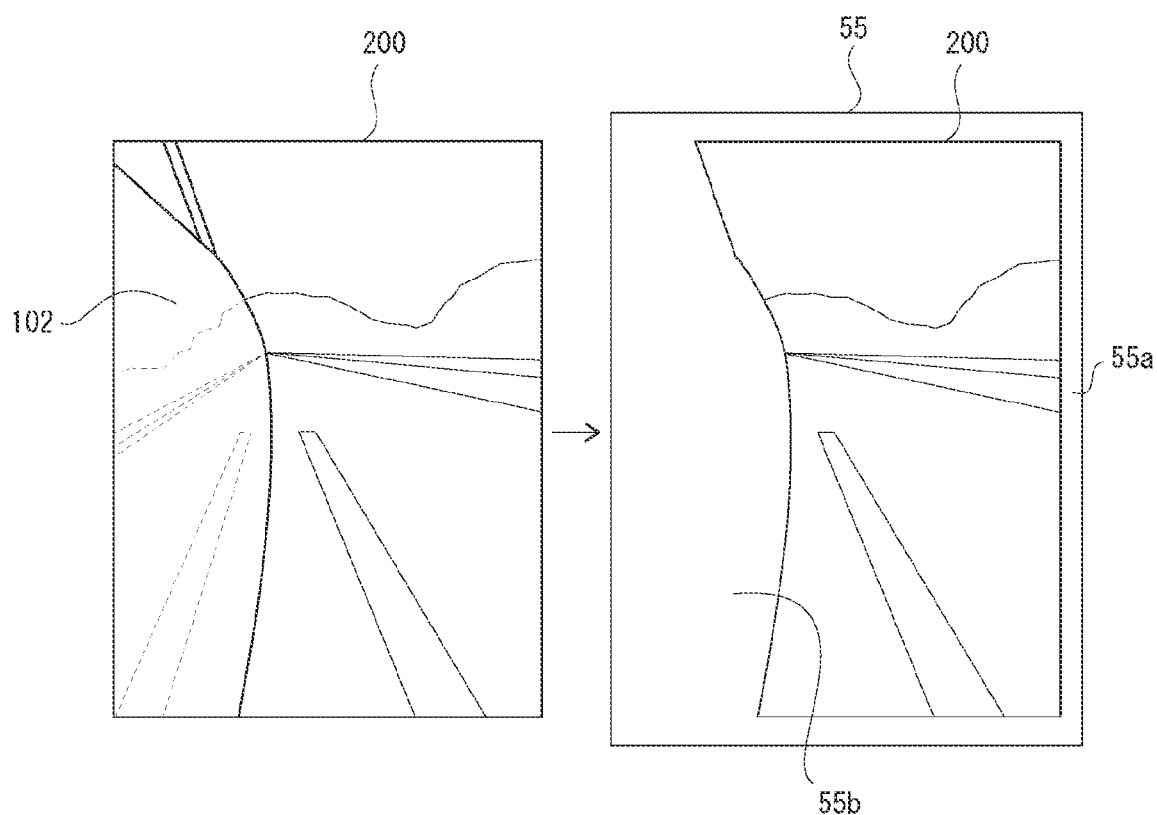
FIG. 28 depicts an example where the side surface is covered by the translucent cover.

A fifth example of the image distinction means 50 is that the display 200 is provided with a cover 55 as the image distinction means 50 (refer to FIG. 28). The cover 55 has a part to be mounted 55a having a frame shape and to be attached to an outer edge of the display 200 and a covering part 55b configured to cover an image of the side surface 102 to be displayed on the screen.

Therefore, the side surface 102 to be displayed on the screen of the display 200 is covered by the covering part 55b of the cover 55, so that the side surface 102 and a part except for the side surface 102 are visually distinguished.

In the meantime, the covering part 55b of the cover 55 may be formed to have a line shape for covering the outer edge of the side surface 102. In this case, the outer edge of the side surface 102 to be displayed on the screen of the display 200 is covered by the line-shaped covering part 55b of the cover 55, so that the side surface 102 and a part except for the side surface 102 are visually distinguished.

As described above, the cover 55 configured to cover at least a part of the side surface 102 to be displayed on the screen of the display 200 is provided as the image distinction means 50, so that the side surface 102 and a part except for the side surface 102 can be visually distinguished by the simple configuration.

In the meantime, the display 200 may be integrally incorporated in advance in a dashboard of the vehicle 100, for example. In this case, a covering part having the same shape as the covering part 55b may be provided as a part of the dashboard, and at least a part of the side surface 102 may be covered by the covering part provided for the dashboard.

Meanwhile, in the vehicle lamp having the light source and the camera module and configured to capture the region ranging from the rear to the side by the camera module, it is needed that the capturing region is to be clearly recognized when the driver or the like visually recognizes an image being captured, so as to secure the safe driving.

Therefore, it is needed that a part of the side surface of the vehicle body is captured by the camera module and the captured part of the side surface is displayed on the screen.

When the side surface of the vehicle body is displayed on the screen, a surrounding scene or a road surface is projected on the side surface of the vehicle body, depending on external environments and the like, so that the driver or the like may falsely recognize the projected scene or road surface as a true scene or road surface, which causes a problem with respect to the driving.

Therefore, it is needed to prevent the false recognition on an image, which is to be captured with being projected to the side surface of the vehicle body by the camera module.

As described above, when an image is captured by the camera module 30 and is displayed on the screen of the display 200, at least a part of the side surface 102 is covered or made unclear on the screen by the image distinction means 50, so that the side surface 102 and a part except for the side surface 102 are visually distinguished.

Therefore, upon the capturing by the camera module 30, the screen of the display 200 is visually recognized with at least a part of the side surface 102 being covered or made unclear. Thereby, even when a surrounding scene or road surface is projected on the side surface 102, the driver or the like does not falsely recognize the projected scene or road surface as a true scene or road surface, so that it is possible to prevent the false recognition on an image, which is to be captured with being projected to the side surface 102 by the camera module 30.

Figure 29:
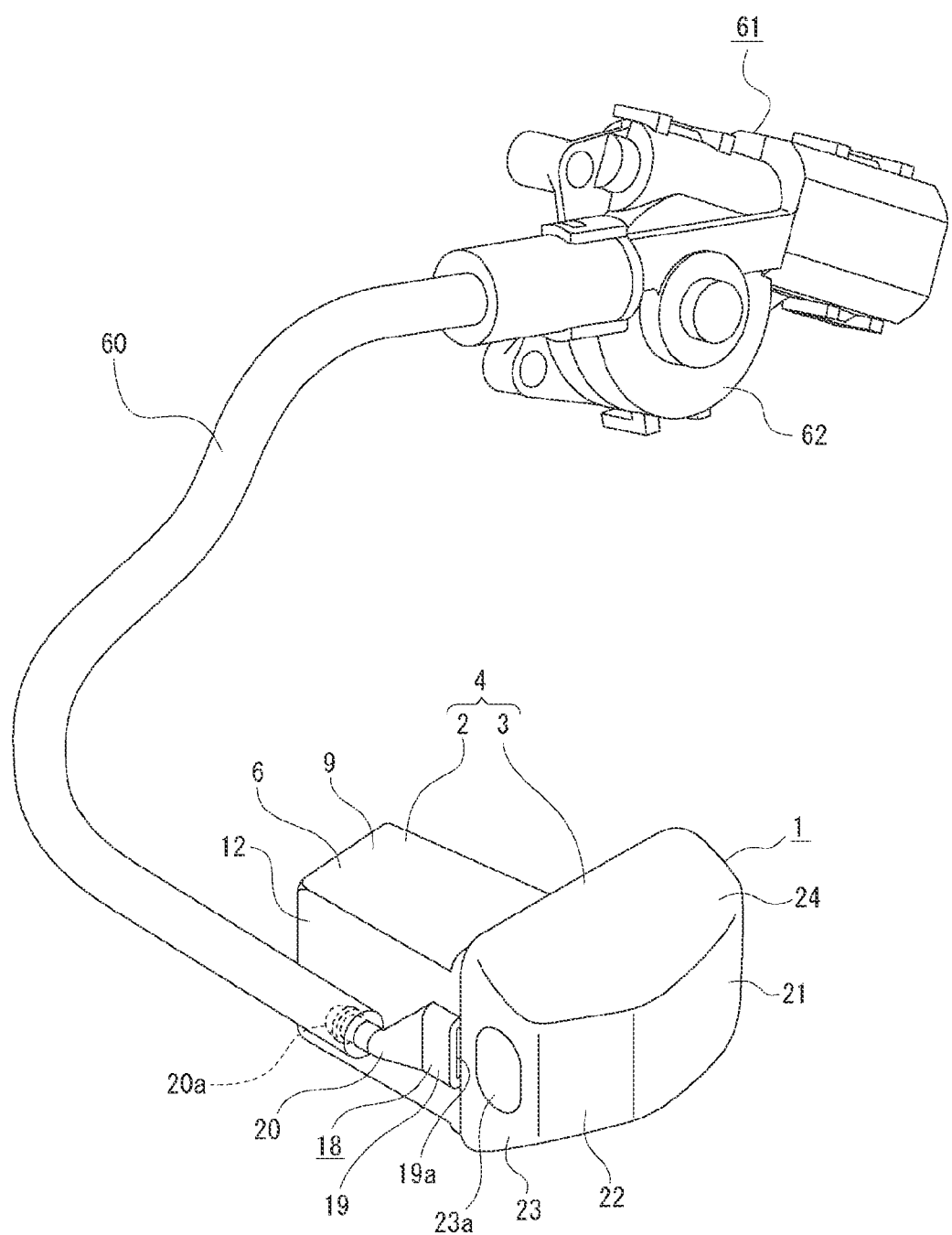
FIG. 29 is a perspective view depicting a state where the vehicle lamp and a high-pressure air generation unit are connected by means of a piping.

As described above, in the vehicle lamp 1, the fluid, for example, the high-pressure air is discharged from the nozzle 18. As shown in FIG. 29, one end portion of a piping 60 is coupled to the coupling cylinder part 20 of the nozzle 18, and the other end portion of the piping 60 is coupled to a high-pressure air generation unit 61 mounted to a part of the vehicle body 101 in the vehicle 100.

Figure 30:
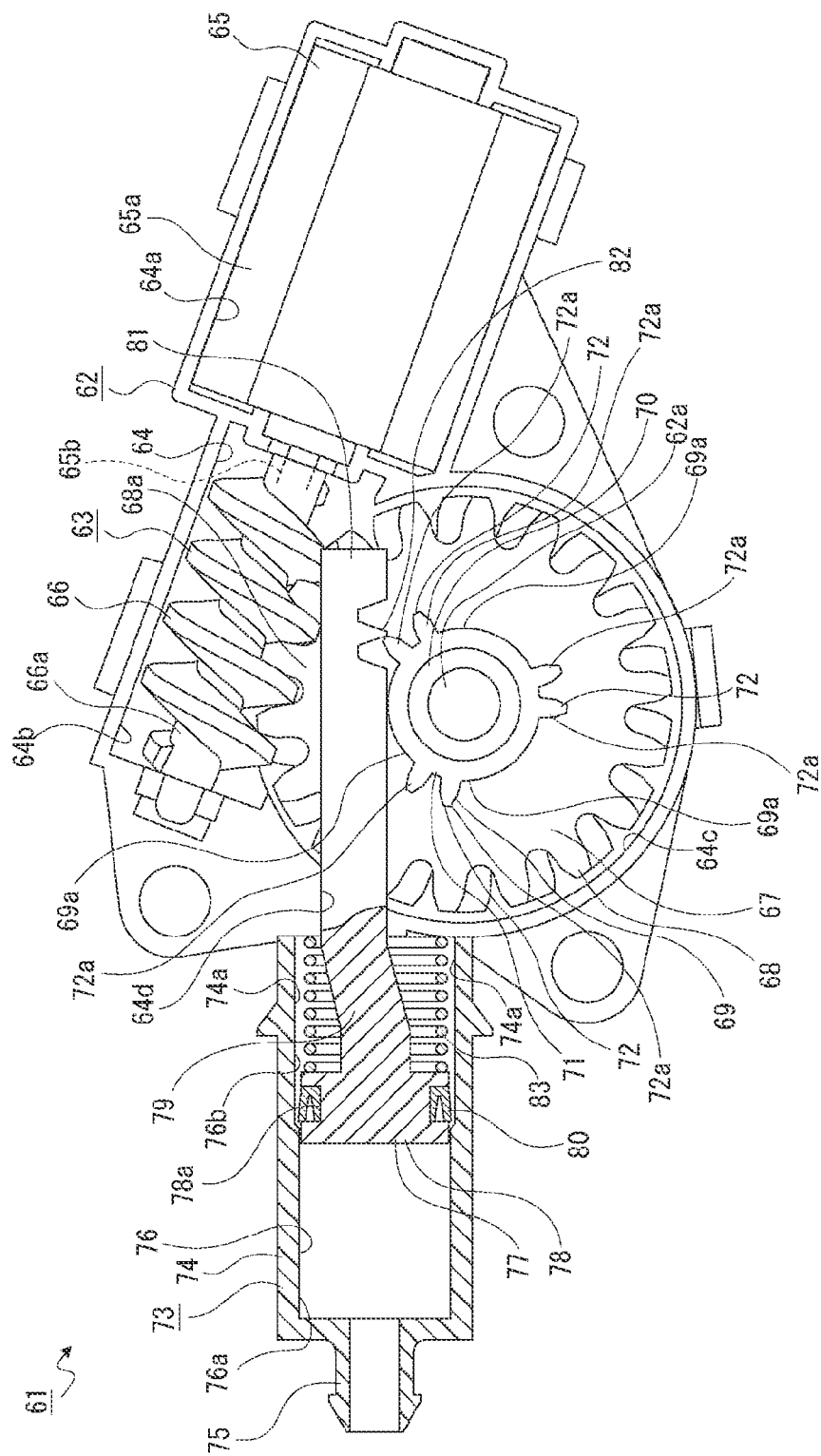
FIG. 30 depicts an internal structure of the high-pressure air generation unit.

The high-pressure air generation unit 61 has a case body 62 and a moving mechanism 63 disposed in the case body 62 (refer to FIG. 30).

An inside of the case body 62 is formed as an arrangement space 64, and the arrangement space 64 has a motor arrangement part 64a, a worm arrangement part 64b and a gear arrangement part 64c. The motor arrangement part 64a and the worm arrangement part 64b are located to communicate with each other in the front and back direction, and the worm arrangement part 64b and the gear arrangement part 64c are located to communicate with each other in the upper and lower direction. A rear end portion of the case body 62 is formed with an insertion hole 64d penetrating in the front and back direction. The insertion hole 64d is configured to communicate with an outside of the case body 62 and the gear arrangement part 64c.

The case body 62 is provided with a support shaft part 62a protruding laterally, and the support shaft part 62a is located in the gear arrangement part 64c.

The moving mechanism 63 includes a driving motor 65, a worm 66 and a worm wheel 67.

The driving motor 65 has a main body part 65a and a motor shaft 65b, and the main body part 65a is disposed in the motor arrangement part 64a.

The worm 66 is coupled and fixed to the motor shaft 65b, and is disposed in the worm arrangement part 64b.

The worm wheel 67 is configured by a driven gear (helical gear) 68 and a pinion 69 protruding laterally from a center portion of the driven gear 68, which are integrally formed (refer to FIG. 30). The worm wheel 67 is disposed in the gear arrangement part 64c, and a center portion thereof is supported to the support shaft part 62a of the case body 62 via a bearing 70.

The driven gear 68 is meshed with the worm 66.

The pinion 69 is disposed coaxially with the driven gear 68, and has an annular part 71 externally fitted and supported to the bearing 70 and gear parts 72, 72, 72 provided at an outer periphery-side of the annular part 71. The gear parts 72, 72, 72 are equally spaced in a circumferential direction.

The gear part 72 is configured by a plurality of, for example, two gear teeth 72a, 72a. The number of the gear teeth 72a of the gear part 72 is arbitrary, and may be one or three or more.

The pinion 69 has a diameter of a tooth tip circle smaller than a diameter of a tooth bottom circle of the driven gear 68. Parts between the gear parts 72, 72, 72 are respectively formed as tooth-missing parts 69a, 69a, 69a having no gear teeth 72a. The tooth-missing parts 69a are equally spaced in the circumferential direction, and three tooth-missing parts are formed, for example.

A rear end portion of the case body 62 is coupled with a cylinder 73 (refer to FIG. 30). The cylinder 73 is coupled with protruding rearward from the case body 62. The cylinder 73 has a piston support part 74 and a coupling protrusion 75 protruding rearward from the piston support part 74, which are integrally formed, and a diameter of the piston support part 74 is greater than a diameter of the coupling protrusion 75.

Figure 31:
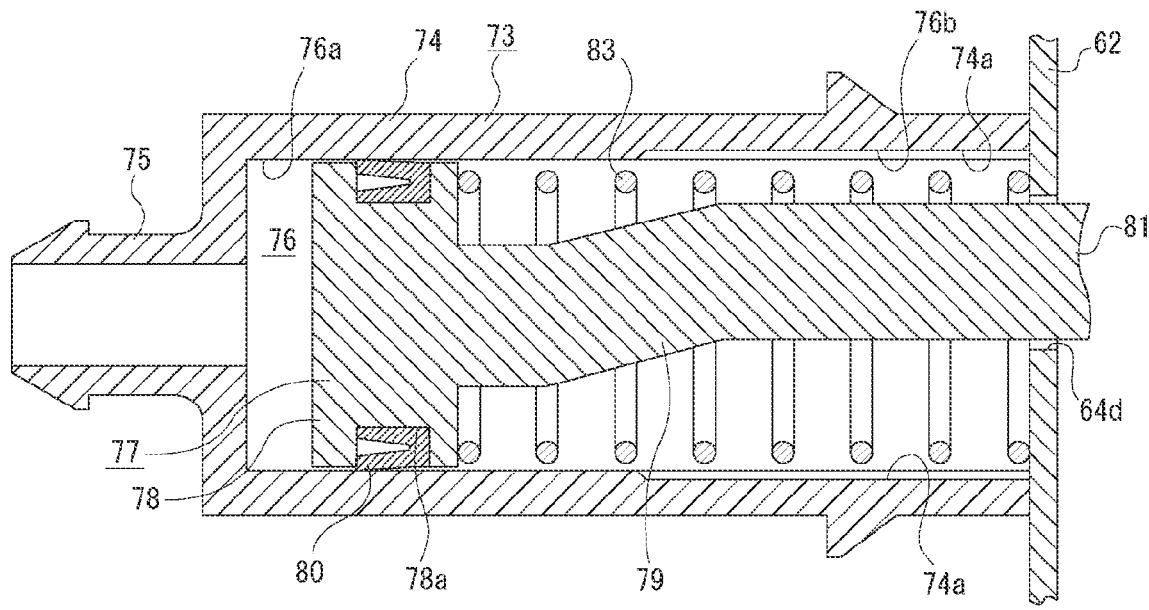
FIG. 31 is an enlarged sectional view depicting a state where a piston is located at a top dead center.
Figure 32:
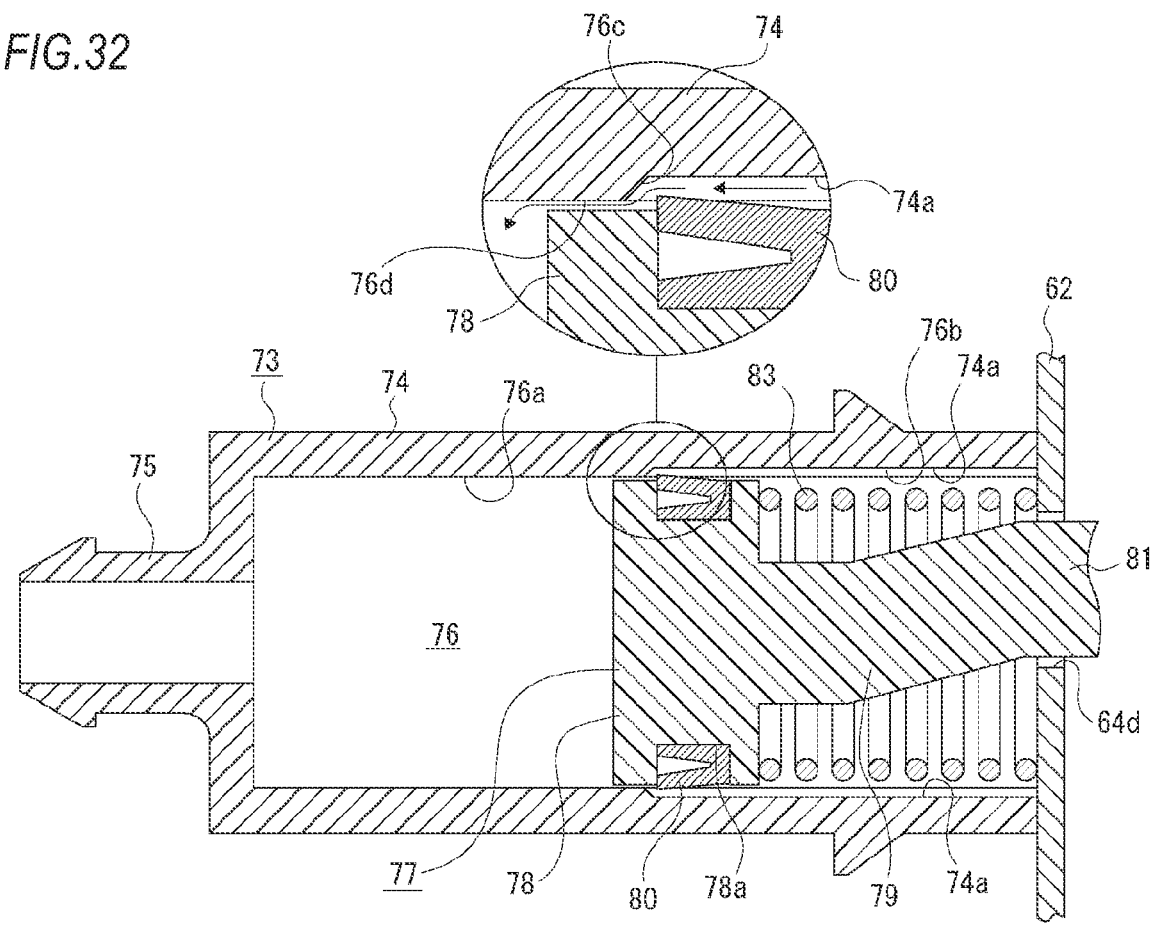
FIG. 32 is an enlarged sectional view depicting a state where the piston is located at a bottom dead center.

An internal space 76 of the piston support part 74 includes a first space 76a, which is a substantial half rear part, and a second space 76b, which is a substantial half front part (refer to FIGS. 31 and 32).

The piston support part 74 is formed in the second space 76b with air inlet grooves 74a, 74a extending in the front and back direction and spaced in the circumferential direction (refer to FIGS. 31 and 32).

The air inlet grooves 74a, 74a are formed in the second space 76b of the piston support part 74, so that a diameter of a part of the second space 76b, at which the air inlet grooves 74a, 74a are formed, is slightly greater than a diameter of the first space 76a. A diameter of a part of the second space 76b, at which the air inlet grooves 74a, 74a are not formed, is the same as the diameter of the first space 76a. The piston support part 74 is formed with stepped surfaces 76c, 76c at boundary portions between the first space 76a and the air inlet grooves 74a, 74a, respectively (refer to FIG. 32).

The piston support part 74 is formed with an air inlet hole (not shown), so that the exterior air is introduced from the air inlet hole into the air inlet grooves 74a, 74a.

A central axis of the coupling protrusion 75 coincides with a central axis of the piston support part 74, and the coupling protrusion 75 is coupled with the other end portion of the piping 3.

A piston 77 is movably supported to the piston support part 74 of the cylinder 73 (refer to FIG. 30). The piston 77 has an operating part 78, which is thin in the front and back direction and has a substantial cylinder shape, and a coupling part 79 protruding obliquely forward and upward from a central portion of the operating part 78, and the operating part 78 is formed with a circular ring-shaped arrangement groove 78a opening outward. An outer diameter of the operating part 78 is slightly smaller than the diameter of the first space 76a of the piston support part 74. Therefore, a gap 76d is formed between an outer peripheral surface of the operating part 78 and an inner peripheral surface of the piston support part 74 in the first space 76a.

In the arrangement groove 78a, a seal part 80 is disposed. The seal part 80 is formed of an elastically deformable rubber or resin, and an outer peripheral portion thereof protrudes outward from the outer peripheral surface of the operating part 78.

The piston 77 is configured to reciprocally move in the front and back direction between a top dead center and a bottom dead center of the cylinder 73. At the top dead center, the operating part 78 is entirely located in the first space 76a (refer to FIG. 31), and at the bottom dead center, the seal part 80 is entirely located in the second space 76b and a rear end portion of the operating part 78 is located in the first space 76a (refer to FIG. 32).

As the seal part 80 slides along an inner peripheral surface of the cylinder 73 in the first space 76a (refer to FIG. 31) and the seal part 80 slides along an inner peripheral surface of the second space 76b at a part except for the air inlet grooves 74a, 74a of the cylinder 73, the piston 77 is spaced from the inner peripheral surface of the piston support part 74 of the cylinder 73 at the portion at which the air inlet grooves 74a, 74a are formed (refer to FIG. 32). Therefore, at the state where the piston 77 is located at the bottom dead center, the air (exterior air) introduced into the second space 76b passes through the gap 76d along the stepped surfaces 76c, 76c and flows toward the first space 76a.

The coupling part 79 of the piston 77 is coupled with a rack 81 extending in the front and back direction. The rack 81 is formed integrally with the piston 77, for example.

The rack 81 is formed with a rack part 82 in the vicinity of a front end thereof. The rack part 82 is configured by three rack teeth 82a, 82a, 82a, for example. The number of the rack teeth 82a of the rack part 82 is arbitrary, and may be two or less or four or more. The rack 81 is inserted into the insertion hole 64d of the case body 62, and the rack part 82 can be meshed with the gear part 72 of the pinion 69 of the worm wheel 67.

An urging spring 83 is supported in the piston support part 74 of the cylinder 73 between the operating part 78 of the piston 77 and an outer surface of the case body 62. The urging spring 83 is a compression coil spring, for example, and the piston 77 and the rack 81 are urged rearward by the urging spring 83. In the meantime, regrading a moving direction of the piston 77, a rearward direction in which the air is to be delivered is a delivery direction, and the piston 77 and the rack 81 are urged in the delivery direction by the urging spring 83.

The high-pressure air generation unit 61 is operated as follows (refer to FIGS. 33 to 35).

Figure 33:
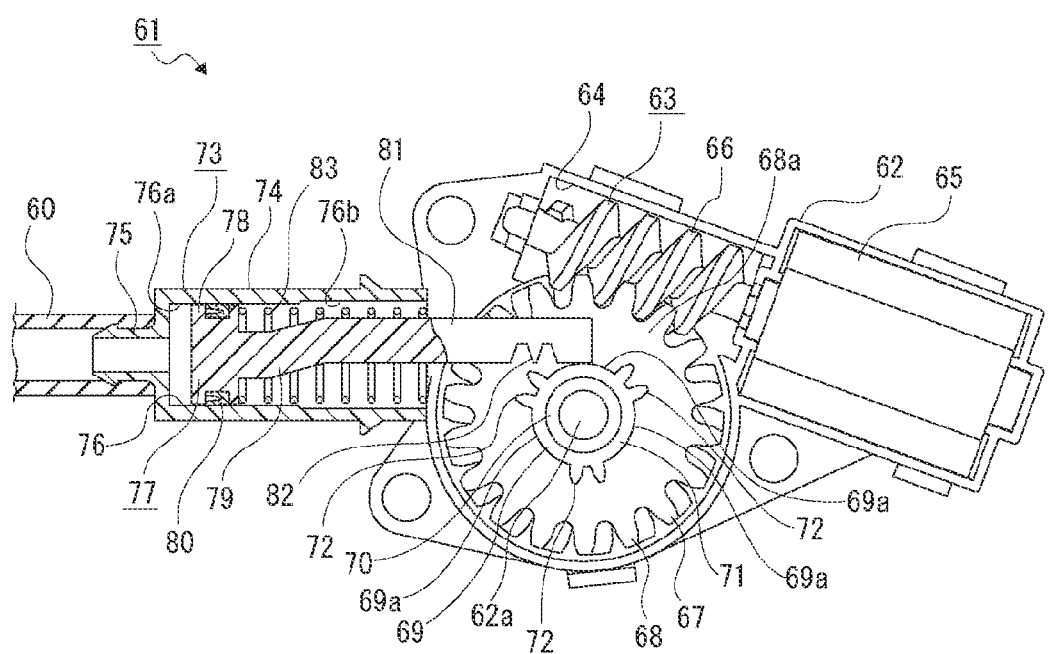
FIG. 33 is a sectional view of an initial state, depicting an operation of the high-pressure air generation unit together with FIGS. 34 and 35.

First, an initial state before the high-pressure air is delivered is described (refer to FIG. 33).

At the initial state, the piston 7 is located at the top dead center, and the rack 81 is located at the tooth-missing part 69a without the rack part 82 being meshed with the gear parts 72, 72, 72 of the pinion 69.

Figure 34:
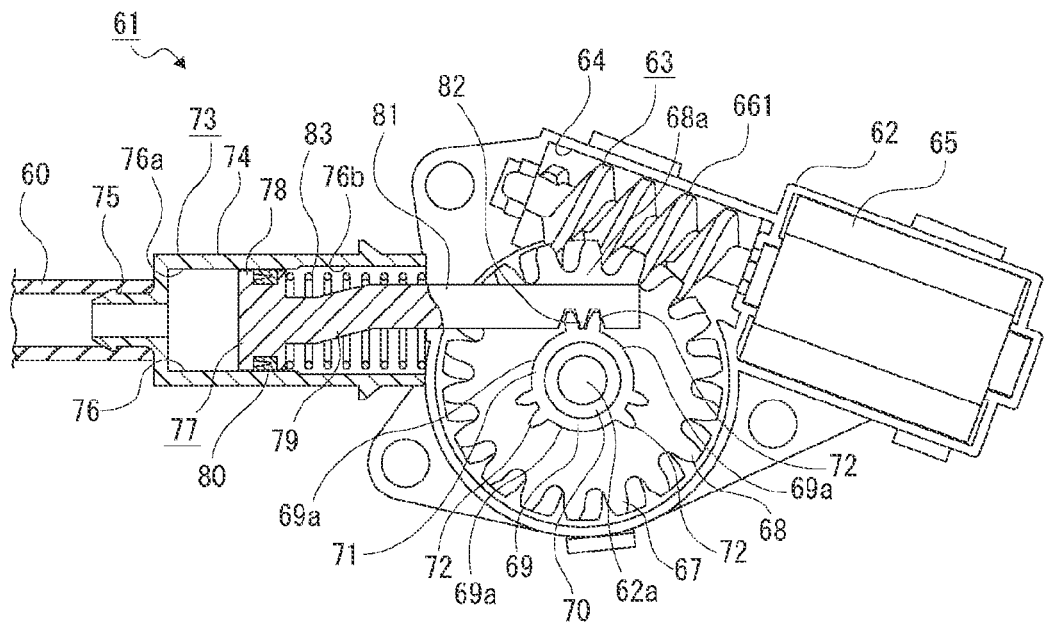
FIG. 34 is a sectional view depicting a state where the piston has moved between the top dead center and the bottom dead center.

When the driving motor 65 starts to drive at the initial state and a driving force of the driving motor 65 is transmitted to the worm wheel 67 via the worm 66, the gear part 72 of the pinion 69 is meshed with the rack part 82 of the rack 81 (refer to FIG. 34). Therefore, as the pinion 69 rotates, the rack 81 moves in an opposite direction to the delivery direction against the urging force of the urging spring 83.

Figure 35:
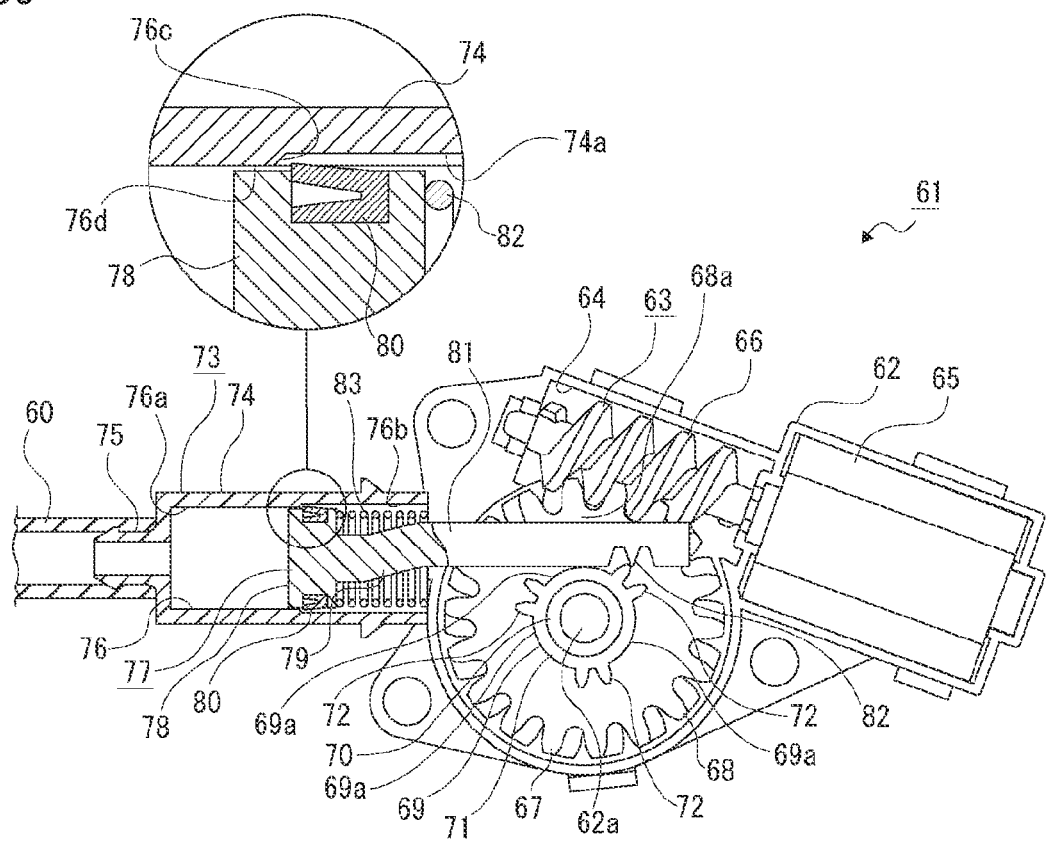
FIG. 35 is a sectional view depicting a state where the piston has moved to the bottom dead center.

When the rack 81 moves in the opposite direction to the delivery direction as the pinion 69 rotates, the meshing between the gear part 72 and the rack part 82 is released at a predetermined position and the piston 77 is located at the bottom dead center (refer to FIG. 35). At the state where the piston 77 is located at the bottom dead center, as described above, the air (exterior air) introduced into the second space 76b passes through the gap 76d along the stepped surfaces 76c, 76c and flows toward the first space 76a.

The piston 77 having moved to the bottom dead center is moved in the delivery direction at higher speed than the moving speed in the opposite direction to the delivery direction by the urging force of the urging force because the meshing between the gear part 72 and the rack part 82 is released, and the air introduced into the first space 76a from the second space 76b passes the coupling protrusion 75 from the piston support part 74 and is delivered toward the nozzle 18 of the nozzle unit 2. At this time, since the diameter of the coupling protrusion 75 of the cylinder 73 is smaller than the diameter of the piston support part 74, the air delivered from the piston support part 74 through the coupling protrusion 75 is compressed to be a high-pressure air, which is then delivered from the piping 3 toward the coupling protrusion 75. Then, the high-pressure air is injected from the nozzle 18 and is ejected to the transmission window 23a of the translucent cover 3.

The high-pressure air injected from the nozzle 18 is ejected to the transmission window 23a, so that the foreign matters such as dust, mud, drop of water and the like attached to the transmission window 23a are blown off and the contamination of the transmission window 23a is thus solved.

In the meantime, when the piston 77 is located in the vicinity of the top dead center with being stopped at any position, the gear part 72 of the pinion 69 is not meshed with the rack part 82 of the rack 81, and the piston 77 is moved to the top dead center by the urging force of the urging spring 83.

In the vehicle lamp having the camera module, the capturing light passes through the transmission window of the translucent cover and enters into the camera module. Therefore, a quality of an image to be captured by the camera module and to be displayed on the screen may be deteriorated depending on a state of the translucent cover.

In particular, since the vehicle travels outdoor, a possibility that the foreign matters such as raindrops, dust, mud and the like will be attached to the translucent cover is high depending on the weather, traveling states and the like. Therefore, it is necessary to improve a quality of an image to be displayed on the screen so as to improve the safety upon the traveling of the vehicle.

Therefore, it is needed to improve a quality of an image to be captured by the camera module.

As described above, in the vehicle lamp 1, the fluid discharged from the nozzle 18 is ejected to the transmission window 23a. Therefore, the foreign matters such as moisture, dust, mud and the like attached to the transmission window 23a are removed, so that a quality of an image to be captured by the camera module can be improved.

In particular, since the vehicle 100 travels outdoor, a possibility that the foreign matters such as raindrops, dust, mud and the like will be attached to the translucent cover 3 is high depending on the weather and the traveling states. Therefore, it is possible to improve a quality of an image to be displayed on the screen of the display 200, thereby improving the safety upon the traveling of the vehicle 100.

Also, in the outer housing 4, the light emitting elements 29, 29 configured to emit the lights to the outside of the camera module 30 are disposed. Therefore, the lights emitted from the light emitting elements 29, 29 are illuminated outside, so that the functionality of the vehicle lamp 1 functioning as the image pickup device for vehicle can be improved.

Furthermore, since the high-pressure air is used as the fluid, the various kinds of foreign matters including liquid attached to the transmission window 23a are removed, so that it is possible to improve a quality of an image to be captured by the camera module 30, irrespective of types of the foreign matters attached to the transmission window 23a.

In the meantime, as the fluid, a liquid such as a cleaning solution, a cleaning water or the like, which contains the other gas, cleaning agent and the like, can be used in addition to the high-pressure air. When the liquid is used as the fluid, a liquid storage tank and a liquid supply device configured to supply the liquid from the storage tank toward the nozzle 18 are provided, instead of the high-pressure air generation unit 61.

However, when the liquid is used as the fluid, droplets discharged from the nozzle 18 may remain on the transmission window 23a. Therefore, it is more preferably to use the high-pressure air, which does not leave the remnant of droplets on the transmission window 23a, as the fluid. Also, when the liquid is used as the fluid, a weight of the vehicle 100 increases due to the storage tank and the liquid stored in the storage tank, which increases the manufacturing cost. Therefore, it is preferably to use the high-pressure air as the fluid, from standpoints of the reduction in weight of the vehicle 100 and the manufacturing cost.

Also, the outer surface of the transmission window 23a of the translucent cover 3 is preferably water repellent finished. When the water repellent finishing is performed on the outer surface of the transmission window 23a, the drops of water are more difficult to be attached to the transmission window 23a, so that it is possible to further improve a quality of an image to be captured by the camera module 30.

Furthermore, the transmission window 23a may be subjected to a hard coating treatment. When the transmission window 23a is hard coated, the transmission window 23a is prevented from being cut or damaged, so that it is possible to further improve a quality of an image to be captured by the camera module 30.

The fluid is discharged from the nozzle 18 when an engine of the vehicle 100 starts, when a driving signal is output to the light emitting elements 29, 29, when a passenger such as a driver operates a discharge start switch provided in the vehicle interior so as to discharge the fluid, when a shift lever is changed to a back gear, and the like, for example. Also, the fluid may be discharged from the nozzle 18, in association with an operation of a wiper or a discharge operation of a washer solution. Furthermore, the fluid may be discharged from the nozzle 18 at a point of time at which bad weather information is obtained in the weather information of a navigation system or at a point of time at which a person, a vehicle or the like is detected by a rear view camera provided for the vehicle 100, for example.

In particular, when the fluid discharge from the nozzle 18 is performed upon startup of the engine of the vehicle 100, the foreign matters attached to the transmission window 23a are removed each before the vehicle 100 starts to travel. Therefore, a quality of an image to be captured by the module camera 30 during the traveling is improved, which contributes to the safe driving.

Also, when the fluid discharge from the nozzle 18 is performed upon the shift to the back gear of the vehicle 100, the foreign matters attached to the transmission window 23a are removed each before the vehicle 100 starts to move rearward. Therefore, a quality of an image to be captured by the module camera 30 during the rearward traveling is improved, which contributes to the safe driving.

Figure 36:
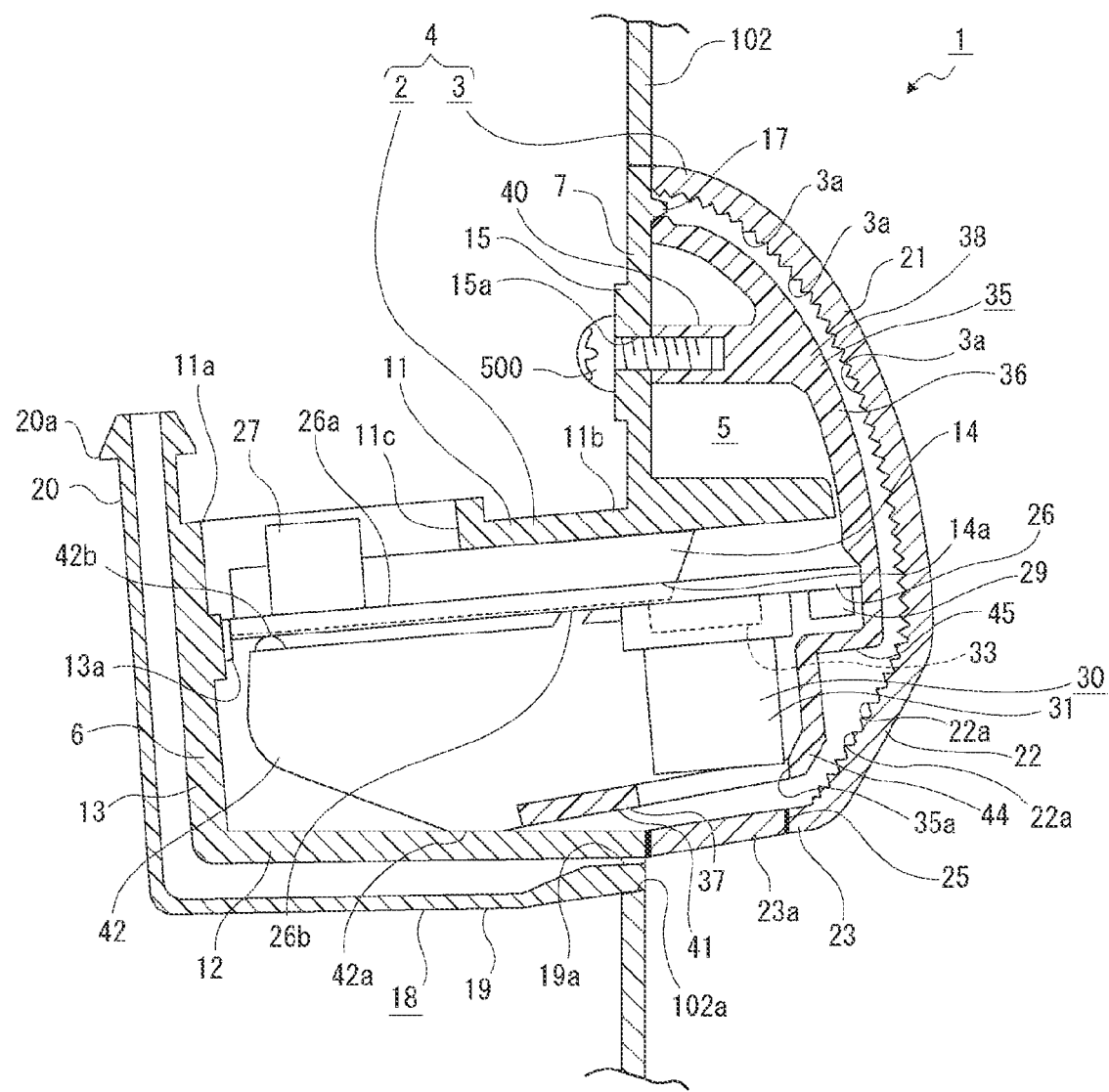
FIG. 36 is a plan view depicting an example where a nozzle is provided from a rear surface part to a bottom surface part of the housing.

In the above, the nozzle 18 is provided integrally with the rear surface part 12 of the housing 2. However, for example, the nozzle 18 may be integrally provided at a portion extending from the rear surface part 12 to the bottom surface part 13 (refer to FIG. 36).

When the nozzle 18 is integrally provided at a portion extending from the rear surface part 12 to the bottom surface part 13, the protrusion direction of the coupling cylinder part 20 of the nozzle 18 is a forward direction, which is the same direction as the protrusion direction of the connector 27 relative to the substrate 26. Therefore, it is possible to perform an operation of connecting a connection terminal of the vehicle 100-side to the connector 27 and an operation of connecting the piping 60 to the nozzle 18 from the same direction, which improves the operability.

DESCRIPTION OF REFERENCE NUMERALS

1 . . . vehicle lamp (image pickup device for vehicle), 2 . . . housing 3 . . . translucent cover, 4 . . . outer housing, 23a . . . transmission window 25 . . . light shield part, 26 . . . substrate, 29 . . . light emitting element 30 . . . camera module, 33 . . . image pickup element, 35 . . . pressing member 26A . . . first substrate, 26B . . . second substrate, 101 . . . vehicle body 102 . . . side surface, 50 . . . image distinction means, 51 . . . shade, 52 . . . step 53 . . . colored part, 54 . . . image processing unit, 100 . . . vehicle, 18 . . . nozzle

The invention claimed is:

1. A vehicle lamp comprising:
an outer housing comprising a housing having an opening and a translucent cover configured to close the opening;
a substrate disposed in the outer housing;
a camera module comprising an image pickup element and disposed on the substrate, and
a light emitting element provided as a light source and disposed on the substrate,
wherein an optical axis of the camera module is inclined more downward than in a horizontal direction,
wherein the translucent cover is provided with a transmission window through which a capturing light to be incident on the camera module is to pass, and
wherein the transmission window is formed to have a shape which is long in an upper and lower direction and is symmetric with respect to the upper and lower direction, and
wherein the translucent cover is provided with a light shield part at a position covering an outer periphery of the transmission window for preventing a light into the camera module, which is to be emitted from the light emitting element and to be guided along an inside of the translucent cover, from entering into the transmission window.

2. The vehicle lamp according to claim 1, wherein the camera module and the light emitting element are disposed on the same surface of the substrate.

3. The vehicle lamp according to claim 1, further comprising a pressing member disposed in the outer housing and mounted to the housing,
wherein the substrate is pressed by the pressing member and is thus positioned relative to the housing.

4. The vehicle lamp according to claim 3, wherein a part of the pressing member is provided as a light shield part for shielding a part of a light to be emitted from the light emitting element.

5. The vehicle lamp according to claim 1, wherein an effective incident region of a capturing light of the image pickup element is formed into a shape having a longitudinal direction and a width direction, and
wherein the image pickup element is disposed in a direction in which the longitudinal direction of the effective incident region is an upper and lower direction.

6. The vehicle lamp according to claim 1, further comprising a connector, which has the functions of inputting power and outputting a signal of the image captured by the camera module, disposed on the substrate at an opposite end portion to the portion at which the light emitting element is disposed.

7. The vehicle lamp according to claim 1, further comprising a pressing member disposed in the outer housing, wherein the substrate is pressed directly by the pressing member.

8. A vehicle lamp system, comprising:
the vehicle lamp according to claim 1, which is mounted on one of the left or the right side of a vehicle; and
a second vehicle lamp which is mounted on another of the left or the right side of the vehicle.

* * * * *